United States Patent
Komatsu et al.

(10) Patent No.: US 7,791,750 B2
(45) Date of Patent: Sep. 7, 2010

(54) IMAGE PROCESSING SYSTEM, METHOD OF CONTROLLING THE IMAGE PROCESSING SYSTEM, AND PROGRAM FOR A PERIPHERAL APPARATUS IN THE SYSTEM

(75) Inventors: Yukihiro Komatsu, Fukuchiyama (JP); Yasuyuki Ikeda, Ayabe (JP)

(73) Assignee: Omron Corporation, Kyoto (JP)

( * ) Notice: Subject to any disclaimer, the term of this patent is extended or adjusted under 35 U.S.C. 154(b) by 1393 days.

(21) Appl. No.: 11/001,642

(22) Filed: Dec. 2, 2004

(65) Prior Publication Data
US 2005/0134911 A1    Jun. 23, 2005

(30) Foreign Application Priority Data

Dec. 3, 2003 (JP) .............................. 2003-404306
Apr. 28, 2004 (JP) .............................. 2004-133065

(51) Int. Cl.
*G06F 3/12* (2006.01)
*G06K 15/00* (2006.01)
(52) U.S. Cl. ..................... 358/1.15; 358/1.13; 358/1.16
(58) Field of Classification Search ................ 358/1.15, 358/471, 1.1, 1.13, 1.16, 1.9, 447, 474; 709/227
See application file for complete search history.

(56) References Cited

U.S. PATENT DOCUMENTS

| 6,286,003 | B1 | | 9/2001 | Muta |
| 6,614,546 | B1 | * | 9/2003 | Kurozasa .................... 358/1.15 |
| 7,154,538 | B1 | * | 12/2006 | Fukasawa et al. ......... 348/211.3 |
| 7,177,448 | B1 | * | 2/2007 | Sah ............................. 382/107 |
| 7,256,821 | B2 | * | 8/2007 | Hata ......................... 348/211.3 |
| 7,315,386 | B1 | * | 1/2008 | Shiimori et al. ............ 358/1.15 |
| 7,321,440 | B2 | * | 1/2008 | Kimura ...................... 358/1.15 |
| 2002/0191082 | A1 | | 12/2002 | Fujino et al. |
| 2003/0035139 | A1 | * | 2/2003 | Tomita et al. .............. 358/1.15 |
| 2003/0120714 | A1 | | 6/2003 | Wolff et al. |

(Continued)

FOREIGN PATENT DOCUMENTS

CN    1204091    1/1999

(Continued)

OTHER PUBLICATIONS

Iura, K., "Docodemo Camera (Camera Anywhere)", Reprt, LAN Times, Japan, Softbank Corp., vol. 7, No. 3, pp. 98-101 (Mar. 1, 1997)(one page English-language translation of p. 98).

(Continued)

*Primary Examiner*—James A Thompson
(74) *Attorney, Agent, or Firm*—Foley & Lardner LLP

(57) ABSTRACT

The image processing apparatus 1 at the manufacturing side can be accessed over the Internet 3 by the peripheral apparatuses 2A, 2B, and 2C at remote locations. When the image processing apparatus 1 receives from any of the peripheral apparatuses 2A, 2B, and 2C an image transmission command based on the HTTP protocol, it generates and transmits a response to the command carrying an image to the commanding peripheral apparatus 2A, 2B, or 2C. The peripheral apparatus 2A, 2B, or 2C upon being energized repeats an action of dispatching another image transmission command, an action of receiving the response, and an action of displaying the display image carried in the response in this order.

8 Claims, 20 Drawing Sheets

U.S. PATENT DOCUMENTS

| | | |
|---|---|---|
| 2003/0146976 A1 | 8/2003 | Liu |
| 2004/0051891 A1* | 3/2004 | Moro et al. ............... 358/1.9 |
| 2005/0007625 A1* | 1/2005 | Garcia .................. 358/1.15 |

FOREIGN PATENT DOCUMENTS

| | | |
|---|---|---|
| CN | 1304616 | 7/2001 |
| JP | 06-096033 | 4/1994 |
| JP | 10-301874 | 11/1998 |
| JP | 2001-237887 | 8/2001 |

OTHER PUBLICATIONS

OMRON Technics; vol. 41, No. 3, Sep. 2001, pp. 266-270.

* cited by examiner

IMAGE PROCESSING SYSTEM, METHOD OF CONTROLLING THE IMAGE PROCESSING SYSTEM, AND PROGRAM FOR A PERIPHERAL APPARATUS IN THE SYSTEM

BACKGROUND OF THE INVENTION

1. Field of the Invention

The present invention relates to a technology for processing with the use of a computer an image produced through shooting an object of interest to measure and analyze the object. Particularly, the present invention relates to a technology for controlling the communications and the processing action between an image processing apparatus and a desired number of peripheral apparatuses in a system which are connected together over a computer network for conducting the measurement action.

2. Description of the Related Art

An image processing apparatus is known as a "visual sensor" and commonly used for positioning assembling components or inspecting finished products at the manufacturing site in the industrial field. Such an image processing apparatus is designed for subjecting an image of interest produced by a camera to binary processing and edge extracting to determine the characteristics and then measuring the location and size of an object from the characteristics. Also, when used for inspection or test, the image processing apparatus can judge from comparing between the measurements and reference thresholds whether the object is good or not before releasing the result of judgment.

However, such a conventional image processing apparatus is equipped with a limited interface such as RS-232C format and can be communicated with external apparatuses only within a given area. For compensation, the applicants of the present invention have developed a modified image processing apparatus provided with an interface connectable with the Ethernet (a registered trade name) (See "Non-stop adjusting function of visual sensor, model F250" by Go Yoshiura, Yusuke Iida, and Yukihiro Komatsu, Omron Technics, OMRON Corporation Technology HQ, Vol. 41, No. 3, September 2001, pp. 266-270). The modified image processing apparatus is installed in a LAN system at the manufacturing site and can thus be increased in the area of communications for exchanging information.

The modified image processing apparatus disclosed in "Non-stop adjusting function of visual sensor, model F250" by Go Yoshiura, Yusuke Iida, and Yukihiro Komatsu, Omron Technics, OMRON Corporation Technology HQ, Vol. 41, No. 3, September 2001, pp. 266-270 is connectable over the Internet to a peripheral apparatus at a remote location (distanced far from the manufacturing site where the image processing apparatus is located). When the image processing apparatus is connected to a remote location, it can be operated by an expert who is absent at the manufacturing site for monitoring an image of interest and modifying the setting for operations, hence improving the expediency.

The modified processing apparatus may yet fail to connect with a peripheral or computer system of a user at the remote location which is protected with a means, such as a firewall or a router, for limiting the input of external data. In addition, the peripheral apparatus used by the user at the remote location is mostly a personal computer and can scarcely allow a worker at the manufacturing site to monitor the action of the user entering or modifying the setting data.

SUMMARY OF THE INVENTION

The present invention has been developed in view of the above aspects and its primary object is to ensure the communications between an image processing apparatus and peripheral apparatus(es) regardless of the network environments of each user while identical images of interest can be viewed at substantially the same time at both the location of the image processing apparatus and the remote location of each peripheral apparatus.

It is a secondary object of the present invention to allow the display screens of both an image processing apparatus and each peripheral apparatus to be updated according the setting action which is carried out by a user at a remote location so that another user at the manufacturing site can acknowledge the setting action.

An image processing system according to the present invention comprises an image processing apparatus and a desired number of peripheral apparatuses connected together over a computer network for carrying out a given measurement action. The image processing apparatus is arranged for processing a motion image or a series of still images in various manners and equipped with a controller as a computer and an interface circuit for communications. The peripheral apparatus is preferably a personal computer accompanied integrally or separately with a display monitor for displaying the images. The peripheral apparatus is loaded with software for acting as a member of the image processing system. The single image processing apparatus may be connected to one or more peripheral apparatuses. Two or more of the image processing apparatuses may be connected over the computer network in the system.

Although the peripheral apparatus remains connected constantly to the computer network, it is preferably communicated with the image processing apparatus under limited conditions. For example, each user is assigned with its password and can access to the system when providing a log-in command from its peripheral apparatus. If the access from the peripheral apparatus is delayed by a given length of time from the start of connection, it may be canceled.

A primary method of controlling the image processing system according to the present invention is featured in which the image processing apparatus repeats a first step of generating an image to be processed, a second step of generating a display image from the image to be processed, and a third step of saving the display image in a memory, and selectively performs, provided that an image transmission command based on a stateless protocol is received from any peripheral apparatus, a fourth step of extracting a desired number of the display images from the latest saved in the memory and a fifth step of generating and transmitting to the peripheral apparatus a response of a specific format to the image transmission command, predetermined by the image processing apparatus, which contains the extracted display images but not a control data of the peripheral, and the peripheral apparatus performs a step A of dispatching to the image processing apparatus the image transmission command of a specific format predetermined by the peripheral apparatus, a step B of receiving the response to the image transmission command from the image processing apparatus, and a step C of displaying the display image, carried in the response, at a specific format predetermined by the peripheral apparatus on its monitor.

The image processing apparatus allows a user to perform a measurement action for the purpose while monitoring the object of interest in a motion image or a series of still images. The display image is not only the image of the object to be measured but also an image of information such as a modified image (e.g., binary image or edge enhanced image), a profile of the result of measurement (e.g., histogram, graph, or numerals), a data of the judgment for inspection, and a time table for the processing action. The display image can be displayed on the monitor provided separately or integrally with the image processing apparatus. The display images produced for a given length of the past time can be saved in a succession or at intervals of a desired number in the memory.

The stateless protocol employed in the present invention is designed for producing and transmitting a response to a command to the destination which has dispatched the command. The HTTP protocol is a typical example of the stateless protocol as used preferably.

When cycles of the communication at the stateless protocol are carried out between two apparatuses, the apparatus at the response side can transmit a response of information independently upon receiving each command regardless of the preceding or succeeding contents of command. In a common computer system, every response to a command of the stateless protocol can be accepted. Since the present invention allows the communications between the image processing apparatus and each peripheral apparatus to be conducted at the stateless protocol format, its controlling action over the communications can hardly be interrupted by any means for limiting the input of external data such as a firewall or a router.

At the fourth step in the image processing apparatus, the latest display image can be read out from the memory. When a number of the images are saved in the memory, a desired succession of the images from the latest can be obtained. A group of the images read out from the memory are allocated in a time sequence and carried on the response. Among a group of the images, the earliest is extracted directly and the others may be modified to differential images based on the previous image. In that case, the differential images may be treated as the display images. The display images can also be subjected to the compression and encryption processing.

The peripheral apparatus according to the present invention is arranged for dispatching an image transmission command, receiving from the image processing apparatus a response to the command which carries the latest display image at the time, and displaying the latest image on its monitor screen. When the response carrying two or more display images is received, the peripheral apparatus can display the images in a succession from the earliest.

The method according to the present invention may be modified, as a first feature, in which the image processing apparatus performs the fourth and fifth steps whenever receiving the image transmission command from the peripheral apparatus, and the peripheral apparatus repeats the step A and the step B in this order and performs the step C while repeating the step B. More specifically, the peripheral apparatus dispatches a command for transmission of the image to the image processing apparatus and upon receiving the response to the command, display the image before dispatching another image transmission command. Although the step C for displaying the image is carried out after the receipt of the response is completed, it may be conducted in parallel to the step of receiving the response (as will be eligible for the following modifications).

When the processing steps are hastened in the peripheral apparatus, the image can be displayed at almost the same time as in the image processing apparatus. This allows the user at the remote location to communicate and cooperate smoothly with the user at the image processing apparatus while monitoring the same image. Also, the action and the result of measurement in the image processing apparatus can be shared by the two users at different locations.

Even if its speed of processing or communication is not speeded up, the peripheral apparatus can receive the latest display image at the moment when the receipt of the image is ready. Alternatively, the display image to be transmitted is decimated in the size of data by the action of the image processing apparatus to match the speed of processing or communication at the peripheral apparatus. In the latter case, the display image may be displayed at a lower rate of definition (a jogged image) on the monitor of the peripheral apparatus. As the display image is lagged by a negligible time from that of the image processing apparatus, it permits the user at the peripheral apparatus to acknowledge the action o the image processing apparatus without error.

The response carrying the display image but not the controlling data for the peripheral apparatus is produced at a desired form at predetermined by the image processing apparatus. Also, the peripheral apparatus is assigned with desired formats for dispatching the image transmission command and displaying the display image which are predetermined by the peripheral apparatus. The software installed in the peripheral apparatus is a specific one designed for the image processing system but not the Web browser. It is true for handling the response transmitted from the image processing apparatus with the Web browser to attach the controlling data to the data of the response in addition to the image data, hence increasing the overall data size of the response. This will cause the peripheral apparatus to retard its display action when the controlling data carried in the response is operated upon the receiving action. It is particularly unfavorable when the display image is bulky.

The method according to the present invention may be modified, as a second feature, in which the image processing apparatus performs the fourth and fifth steps whenever receiving the image transmission command from the peripheral apparatus, and the peripheral apparatus repeats the step A and the step B in order of B and A after executing the step A at least one time and, as preceded by the step A, performs the step C while repeating the step B. After the image transmission command is dispatched at least once and its response is received, another image transmission command can be dispatched prior to the display of the display image carried in the response.

The second feature dispatches the image transmission command to the image processing apparatus at the timing faster than the first feature. Accordingly, the peripheral apparatus can receive the display images at intervals of a shorter period than the first feature. Even if the display image is fast at the image processing apparatus, its motion will be followed by the corresponding image at the peripheral apparatus.

The method according to the present invention may be modified, as a third feature, in which the image processing apparatus waits for a given period of time when receiving the image transmission command from one peripheral apparatus and, when receiving the image transmission command from another peripheral apparatus during the waiting period, transmits the common response to both the one and another peripheral apparatuses. This allows the image processing apparatus connected with two or more peripheral apparatuses not to necessarily respond to each command from the peripheral apparatus and reduce its role for the controlling action. The common response to the peripheral apparatuses may be produced at the start, the end, or just before the end of the waiting period. The transmission of the common response may be conducted by transmitting one data to the peripheral apparatuses in a sequence.

The method according to the present invention may be modified, as a fourth feature, in which the peripheral apparatus performs one cycle of the steps A, B, and C, determines from the execution of the cycle a processing period of time needed for communicating with the image processing apparatus, and performs a step D of dispatching a secondary image transmission command including the processing period, and the image processing apparatus performs the fourth and fifth steps one time in response to the image transmission command including non of the processing period and when receiving the secondary image transmission command including the processing period, performs the fourth and fifth steps whenever the processing period is elapsed. Also, the peripheral apparatus repeats the steps B and C after completing the step D.

In this feature, the processing period needed for communicating with the image processing apparatus is equivalent to duration of time from the dispatching of the image transmission command to the receipt of the response or from the dispatching of the image transmission command to the display of the image. The image processing apparatus when receiving the image transmission command including the processing period generates and transmits a response automatically when the processing period has been elapsed. Accordingly, the peripheral apparatus can automatically receive and display the latest image on its monitor screen without dispatching another image transmission command.

Alternatively in this feature, the peripheral apparatus allows the steps B and C to be executed one cycle or repeated for a given period before the steps A, B, and C are conducted one cycle. Then, the step D is performed according to the duration of time required for conducting the above steps. The image processing apparatus when receiving another image transmission command including non of the processing period from the peripheral apparatus during its automatic action of generating and transmitting the response, terminates the automatic action of generating and transmitting the response and handles the secondary image transmission command. Accordingly, even when the duration of time needed for the communication is varied by a busy period of the communication network or the like, it can be compensated. In particular, the processing period produced at the initial setting when the communication network is busy can be shortened after the business is eliminated. As a result, the interval between two consecutive actions of receiving the display images will be minimized.

It may also be possible that the peripheral apparatus measures a period of time in which one cycle of the steps B and C is executed during performing the steps B and C after the step D and when the measured period is shorter by a given length than the processing period, repeats the step D through updating the processing period with the measured period. In this case, the image processing apparatus modifies the interval between the fourth step and the fifth step in response to the updated processing period. Accordingly, the processing period can readily be updated when the display image is received at shorter interval than the processing period at the initial setting.

The method according to the present invention may be modified, as a fifth feature, in which the image processing apparatus repeats the fourth and fifth steps in response to the image transmission command from the peripheral apparatus, and the peripheral apparatus performs the step A one time and performs the steps B and C whenever receiving the response from the image processing apparatus.

In this feature, once the image transmission command is dispatched from the peripheral apparatus, the action of the image processing apparatus extracting the display image from the memory and generating and transmitting the response to the command which includes the display image is repeated. Hence, when the peripheral apparatus is a computer sized enough to follow the fourth and fifth steps, its action of displaying the image can substantially be synchronized at the timing with the display action of the image processing apparatus. This allows the user at the peripheral apparatus to monitor the display image at almost the same timing as at the image processing apparatus.

It may also be possible as the fifth feature that the peripheral apparatus, when the receipt of the response is completed at the step B, performs an action of notifying the image processing apparatus of the completion of the receipt, and the image processing apparatus acknowledges the end of the fifth step from the notification of the receipt completion from the peripheral apparatus and repeats the fourth step.

This is feasible when the protocol is used of a lower level (such as TCP protocol) than that of the stateless protocol where a message of completion of the receipt is sent from a party which has received the data. As the protocol divides the response data into packets and transmits the succeeding packet upon receiving a receipt completion message from the peripheral apparatus, the receipt completion message after the transmission of the last packet acts as the receipt completion notification in the above fifth feature.

Accordingly, the display images can be extracted and transmitted at intervals of time corresponding to the speed of processing or communication at the peripheral apparatus. Even when the speed of processing or communication at the peripheral apparatus is not at a higher rate, the display can be updated as timed with that of the image processing apparatus.

The method according to the present invention may be modified, as a sixth feature, in which the peripheral apparatus, when the setting action for the image processing apparatus is conducted at its operation panel, performs a step E of generating and dispatching an setting acceptance command including the setting data to the image processing apparatus, and the image processing apparatus when receiving the setting acceptance command, performs a sixth step of updating the display image with the setting data carried in the command and a seventh step of saving the updated display image in the memory.

The peripheral apparatus conducts the action of examining whether the setting action is made or not in parallel with the steps A, B, and C and performs the step E depending on the setting action. The image processing apparatus when receiving the setting acceptance command produced at the step E generates the latest display image including the setting data (type of the setting action, object of the setting action, and parameters and measurements of the settings) and can thus update the display of the image. As the updated display image is saved in the memory of the image processing apparatus, it can be received by the peripheral apparatus dispatching the image transmission command after the setting acceptance command.

It may be possible, as the sixth feature, in which the setting action includes selecting items for the setting, and the image processing apparatus generates at the sixth step the display image including a menu of the items for the setting when receiving the setting acceptance command including the setting data.

The setting action may also include moving the cursor to a selected item of the menu and clicking the cursor at the selected item. Through conducting the setting action, the conditions of the menu display on the screen at the image processing apparatus can be updated (for example, cursor movement, cursor inversion, another menu, end of menu). Simultaneously, the display screen at the peripheral apparatus can be updated.

This feature allows the image on the monitor screen of the image processing apparatus to be modified and updated by the setting action of the user at the remote location. Also, the updated image is saved in the memory and can be transmitted together with the display data to the peripheral without delay. Accordingly, the setting data on the same image screen can be shared by two users at the manufacturing site and the remote location respectively. The action of the image processing apparatus in response to the setting acceptance command is not limited to the displaying action. For example, when one item in the setting data is entered, its relevant action can be made. When the action of reading a data saved in the image processing apparatus is requested, the data can readily be retrieved and transmitted to the requesting peripheral apparatus.

An image processing system is provided to which the foregoing method of the present invention is applied, as featured in that the image processing apparatus includes an image inputting means for inputting an image to be processed, a display image generating means for generating a display image from the image input by the image inputting means, a memory for saving the display image, a command receiving means for receiving an image transmission command based on a stateless protocol from any peripheral apparatus, an image extracting means for extracting a desired number of the display images from the latest saved in the memory, a responding means for generating and transmitting to the peripheral apparatus a response of a specific format to the image transmission command, predetermined by the image processing apparatus, which contains the extracted display images but not a control data of the peripheral apparatus, and a controlling means for actuating the image extracting means and the responding means, provided that the command receiving means receives the image transmission command, and the peripheral apparatus includes a command dispatching means for dispatching to the image processing apparatus the image transmission command of a specific format predetermined by the peripheral apparatus, a response receiving means for receiving the response to the image transmission command from the image processing apparatus, and a display controlling means for displaying the display image, carried in the response, at a specific format predetermined by the peripheral apparatus.

The image inputting means of the processing apparatus in the system includes an interface circuit and an A/D converter circuit for inputting and processing the image, whereby the image recorded by a camera is acquired and converted into a digital form which is then subjected to the measurement action. If the imaging means is a digital camera, the A/D converter circuit may be eliminated.

The display image generating means, the command receiving means, the image extracting means, the responding means, and the controlling means all are implemented by a computer hardware having corresponding programs. The display image generating means and the image extracting means may be provided in a dedicated hardware.

The display image generating means is arranged for generating the image to be displayed from the image received by the image inputting means, a modification of the image (binary image or edge enhanced image), the result of measurement from the input image or the modified image, and their two or more combination. Also, the display image can be saved in a memory by the display image generating means. The memory may be sized for saving one or preferably more display images.

The command receiving means is arranged for receiving a command from the peripheral apparatus via a communication interface connected with the computer network. The responding means is also arranged for transmitting a response to the peripheral apparatus via the communication interface.

The command dispatching means, the response receiving means, and the display controlling means in the peripheral apparatus are implemented by corresponding programs installed in the computer as a main control unit in the peripheral apparatus for performing the steps A, B, and C.

The system of the first feature of the present invention may be operated in which the controlling means in the image processing apparatus actuates the image extracting means and the responding means whenever the command receiving means receives the image transmission command from the peripheral apparatus, and the command dispatching means in the peripheral apparatus dispatches another image transmission command whenever the receiving means receives the response and the display controlling means displays the display image.

The system of the second feature of the present invention may be operated in which the controlling means in the image processing apparatus actuates the image extracting means and the responding means whenever the command receiving means receives the image transmission command from the peripheral apparatus, and the command dispatching means in the peripheral apparatus conducts the dispatching of the image transmission command at least one time and dispatches another image transmission command prior to the display controlling means displaying the display image, whenever the receiving means receives the response.

The system of the third feature of the present invention may be operated in which the controlling means in the image processing apparatus directs the responding means to wait for a given period of time when the command receiving means receives the image transmission command from one peripheral apparatus and, when receiving the image transmission command from another peripheral apparatus during the waiting period, transmits the common response to both the one and another peripheral apparatuses. Alternatively, the image extracting means may also be controlled to wait as the responding means does and carry out its image extracting action just before the common response is transmitted.

The system of the fourth feature of the present invention may be modified in which the peripheral apparatus includes a transmission command controlling means for performing one cycle of the actions of the command dispatching means, the response receiving means, and the display controlling means, determining from the execution of the cycle a processing period of time needed for communicating with the image processing apparatus, and directing the command dispatching means to dispatch a secondary image transmission command including the processing period, and the controlling means in the image processing apparatus directs the image extracting means and the responding means to perform their action one time in response to the image transmission command including non of the processing period and when receiving the secondary image transmission command including the processing period, directs the image extracting means and the responding means to perform their action whenever the processing period is elapsed. The dispatch command controlling means in the peripheral apparatus may be implemented by a program for controlling its action.

The system of the fourth feature may further be modified in which the transmission command controlling means in the peripheral apparatus includes a measuring means for measuring a period of time in which one cycle of the actions of the response receiving means and the display controlling means is executed when the secondary image transmission command including the processing period has been received, and a processing period updating means for updating the processing period with the measured period when the measured period is shorter by a given length than the processing period and then directs the command dispatching means to dispatch a further image transmission command including the updated processing period, and the controlling means in the image processing apparatus when receiving the further image transmission command including the updated processing period, modifies the interval between the action of the image extracting means and the action of the responding means according to the updated processing period.

The system of the fifth feature of the present invention may be operated in which the controlling means in the image processing apparatus directs the image extracting means and the responding means to repeat their action in response to the image transmission command received by the command receiving means, and the peripheral apparatus includes a dispatch controlling means for directing the command dispatching means to dispatch the image transmission command one time and then actuating the response receiving means and the display controlling means whenever the response is received from the image processing apparatus. The dispatch controlling means may be implemented by a program.

The system of the fifth feature may further be modified in which the dispatch controlling means in the peripheral apparatus, when the receipt of the response by the response receiving means is completed, performs an action of notifying the image processing apparatus of the completion of the receipt, and the controlling means in the image processing apparatus includes a means for receiving the notification of the receipt completion from the peripheral apparatus and acknowledges the end of the action of the responding means from the notification of the receipt completion and then restarts the action of the image extracting means.

The system of the sixth feature of the present invention may be modified in which the peripheral apparatus includes an inputting means for inputting the setting data for the image processing means and an setting acceptance command dispatching means for, when the setting data for the image processing apparatus is input by the setting action of the inputting means, generating and dispatching an setting acceptance command including the setting data to the image processing apparatus, and the display image generating means in the image processing apparatus, when the setting acceptance command is received by the receiving means, updates the display image with the setting data carried in the command and saves the updated display image in the memory.

The inputting means may be implemented by a computer having a program for providing a desired form of the setting screen on the monitor. The setting acceptance command dispatching means may be implemented by the computer having a program for performing the step E. As the setting acceptance command requires no response from the image processing apparatus, it needs not to be in the form of a stateless protocol such as the image transmission command. Alternatively, the setting acceptance command may be generated of the stateless protocol format so that the display image carried in the response from the image processing apparatus is accompanied with details of the setting data.

The image processing system according to the present invention may be modified, as a more preferable form, in which the setting action includes selecting items for the setting, and the display image generating means in the image processing apparatus generates the display image including a menu of the items for the setting when receiving the setting acceptance command including the setting data. This allows the same menu to be displayed on both the monitor of the image processing apparatus and the monitor of the peripheral apparatus for ease of acknowledging the setting data.

The image processing apparatus in the image processing system may be connected with a console, a monitor, and any other apparatuses as well as the imaging means. Alternatively, those apparatuses may be assembled integral with the image processing apparatus.

The peripheral apparatus is preferably, but not limited to, a personal computer and may be a mobile device (e.g., PDA) having an image displaying function.

A program according to the present invention is provided for functioning a computer as a peripheral apparatus connected over a computer network to an image processing apparatus. The program may be saved in an available storage medium such as CD-ROM or DVD and distributed over the computer network.

The program according to the present invention may be modified in which the computer is assigned with a command dispatching means for dispatching to the image processing apparatus an image transmission command at a specific format or stateless protocol format predetermined by the peripheral apparatus, a response receiving means for receiving a response to the image transmission command from the image processing apparatus, and a display controlling means for displaying a display image, carried in the response, at a specific format predetermined by the peripheral apparatus on its monitor screen. Alternatively, the program may include a program for determining the setting on the peripheral apparatus to match each modification of the image processing system.

The present invention allows the communications between the image processing apparatus and the peripheral apparatus (es) to be conducted regardless of the network environments with the use of the stateless protocol format. Also, since the image produced by the image processing apparatus is displayed substantially at the same timing on the peripheral apparatus, it can be monitored substantially at the same time by a user at the manufacturing site and a user at the remote location, hence ensuring the communications between the two users with smoothness. Moreover, as the understanding of the controlling, measurement, and other actions of the image processing apparatus is shaped by the users at different locations, the image processing system can be improved in the expediency.

The present invention allows the image to be modified by the setting action of the peripheral apparatus and simultaneously displayed at both the image processing apparatus and the peripheral apparatus. Accordingly, the image modified by the setting action of the peripheral apparatus can concurrently be monitored by the users at two different locations. Particularly, the user at the manufacturing site can acknowledge details of the setting action conducted by the user at the remote location and thus carry out its processing action without error even if no one skilled in the operation of the image processing apparatus is present at the site. Also, the knowledge of the skilled user at the remote location can smoothly be transferred to the manufacturing site.

The present invention allows the image processing apparatus to transmit to the peripheral apparatus the response which is produced at a specific format predetermined by the image processing apparatus and carries no control data for the peripheral apparatus while the peripheral apparatus produces an image transmission command and displays the display image carried in the response at a specific format predetermined by the peripheral apparatus. Accordingly, the display screen at the peripheral apparatus can be updated for modifying the setting data and improving the setting action by replacement of the software in the peripheral apparatus which requires no real-time controlling action, but not of the software in the image processing apparatus. It is hence totally unnecessary to conduct such troublesome tasks as removal and resetting of the saved data which are commonly executed for updating the software in the image processing apparatus. Also, any fault, such as communication timing error or measurement discrepancy, which normally occurs during the real-time controlling action due to instability in the matching with undated software can be avoided.

DESCRIPTION OF THE PREFERRED EMBODIMENTS

Figure 1:
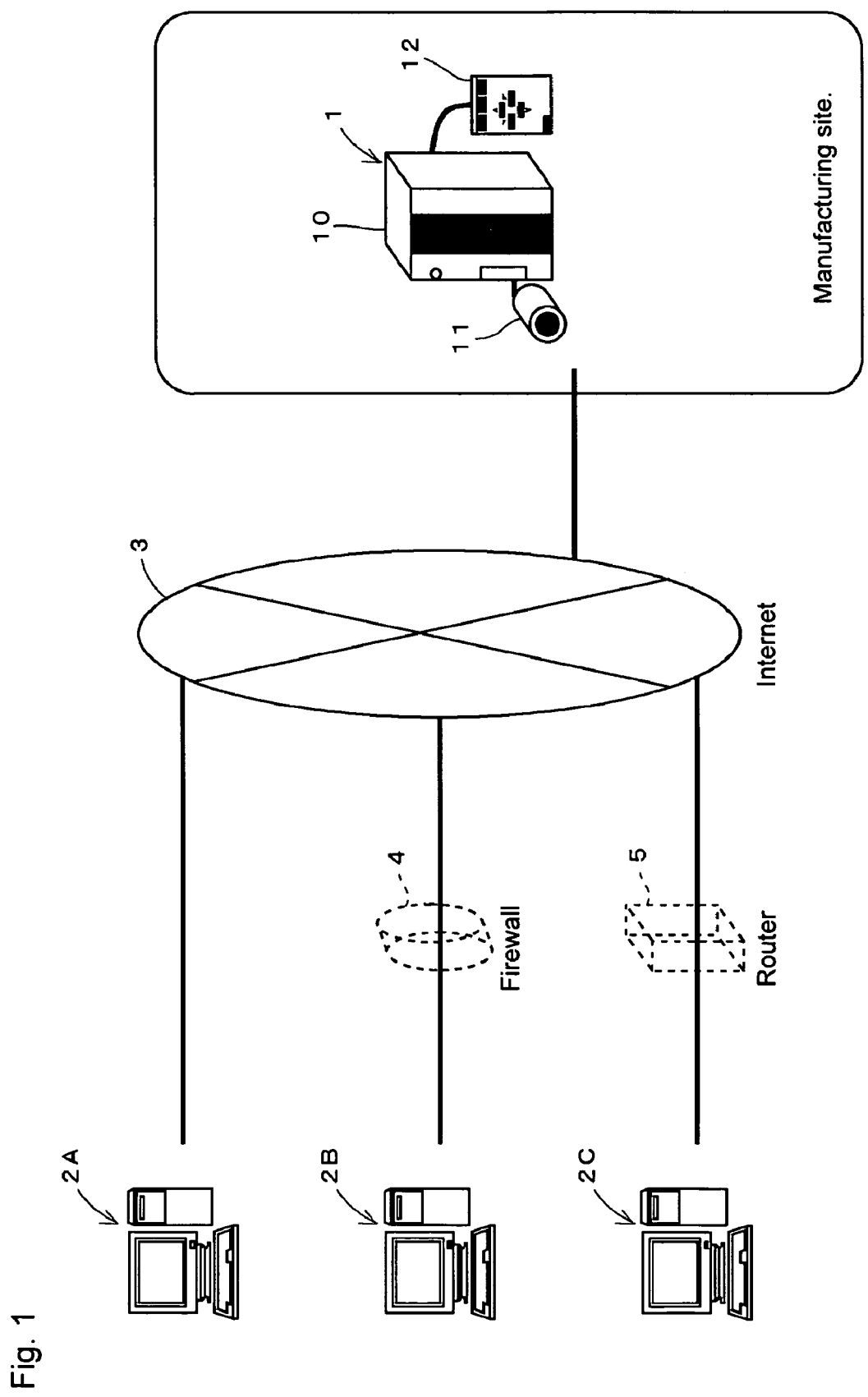
FIG. 1 schematically shows an image processing system according to the present invention.

FIG. 1 schematically illustrates an image processing system according to one embodiment of the present invention.

The image processing system consists mainly of an image processing apparatus 1 provided in a manufacturing site (such as an industrial factory) and peripheral apparatuses 2 provided at (remote) locations distanced from the manufacturing site which are connected by the Internet 3. The peripheral apparatus 2 used for accessing is commonly a personal computer (referred to as a peripheral 2 hereinafter). While a single unit of the image processing apparatus 1 is provided, two or more peripherals 2 (2A, 2B, 2C, and so on in the figure) can be connected in the system.

The image processing apparatus 1 includes an interface circuit for the Ethernet (a registered trade name) which can connect with the Internet 3 via a router (not shown). The peripherals 2 may be assigned to another system such as a LAN or the Intranet. Also, a means for controlling the access to data from the outside, such as a firewall 4 or a router 5, may be provided across a connection between the Internet 3 and the peripheral, e.g., 2B or 2C, as shown.

Figure 2:
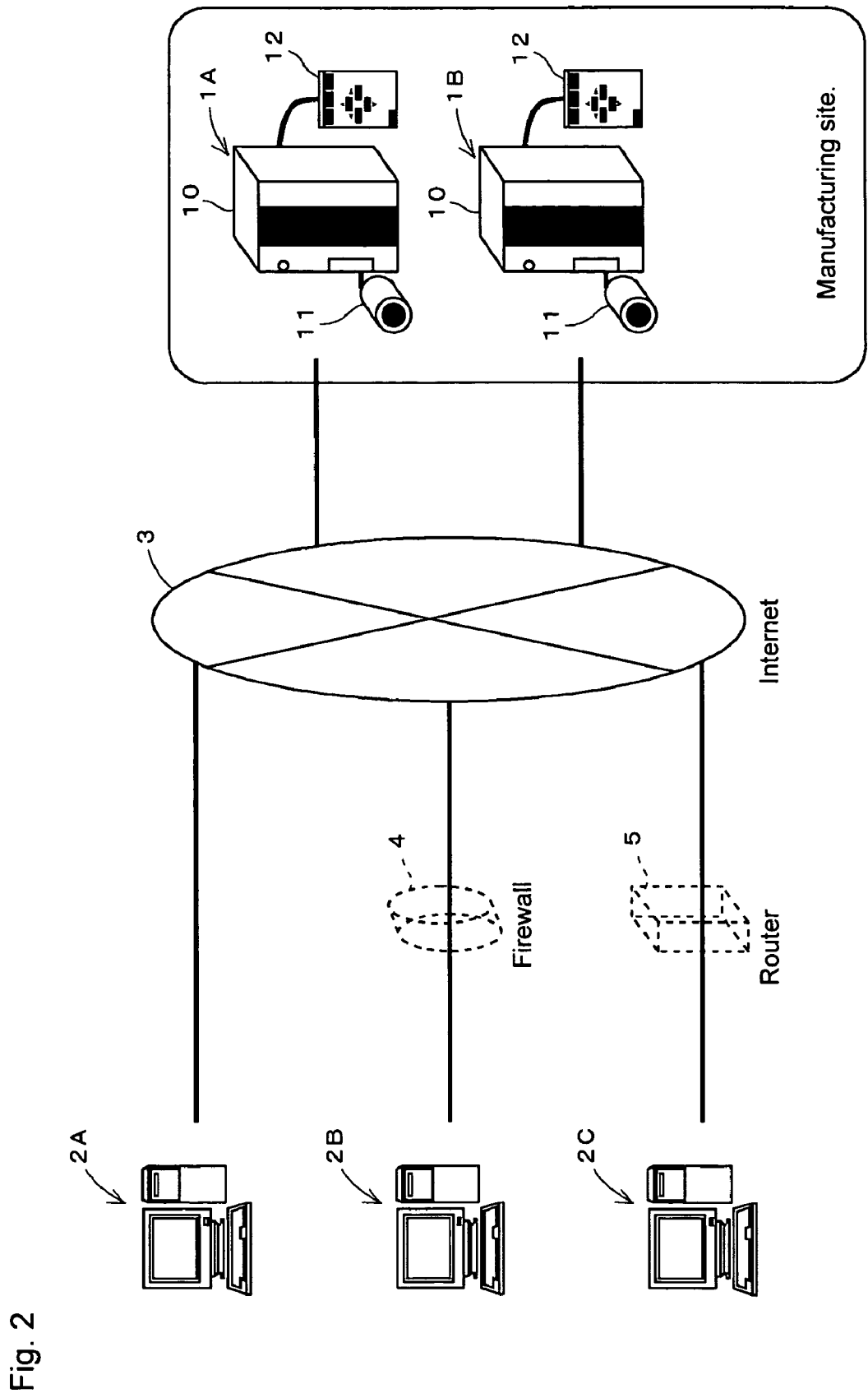
FIG. 2 shows another arrangement of the image processing system.

FIG. 2 illustrates another arrangement of the image processing system. The another arrangement includes two or more image processing apparatuses 1 (two 1A and 1B in the figure). Both the image processing apparatuses 1A and 1B like that of the embodiment shown in FIG. 1 are connected to the Internet 3. Each of the peripherals 2 can selectively connect to one or both of the image processing apparatuses 1A and 1B. The image processing apparatuses 1A and 1B may be located not only in the same manufacturing site but also in different sites respectively.

In FIGS. 1 and 2, the network connected to the computer is not limited to the Internet 3 but may be any user dedicated network which employs the communication protocols (e.g., HTTP or TCP/IP) used over the Internet 3.

One embodiment of the present invention applicable to the system shown in FIG. 1 or 2 will now be described.

Figure 3:
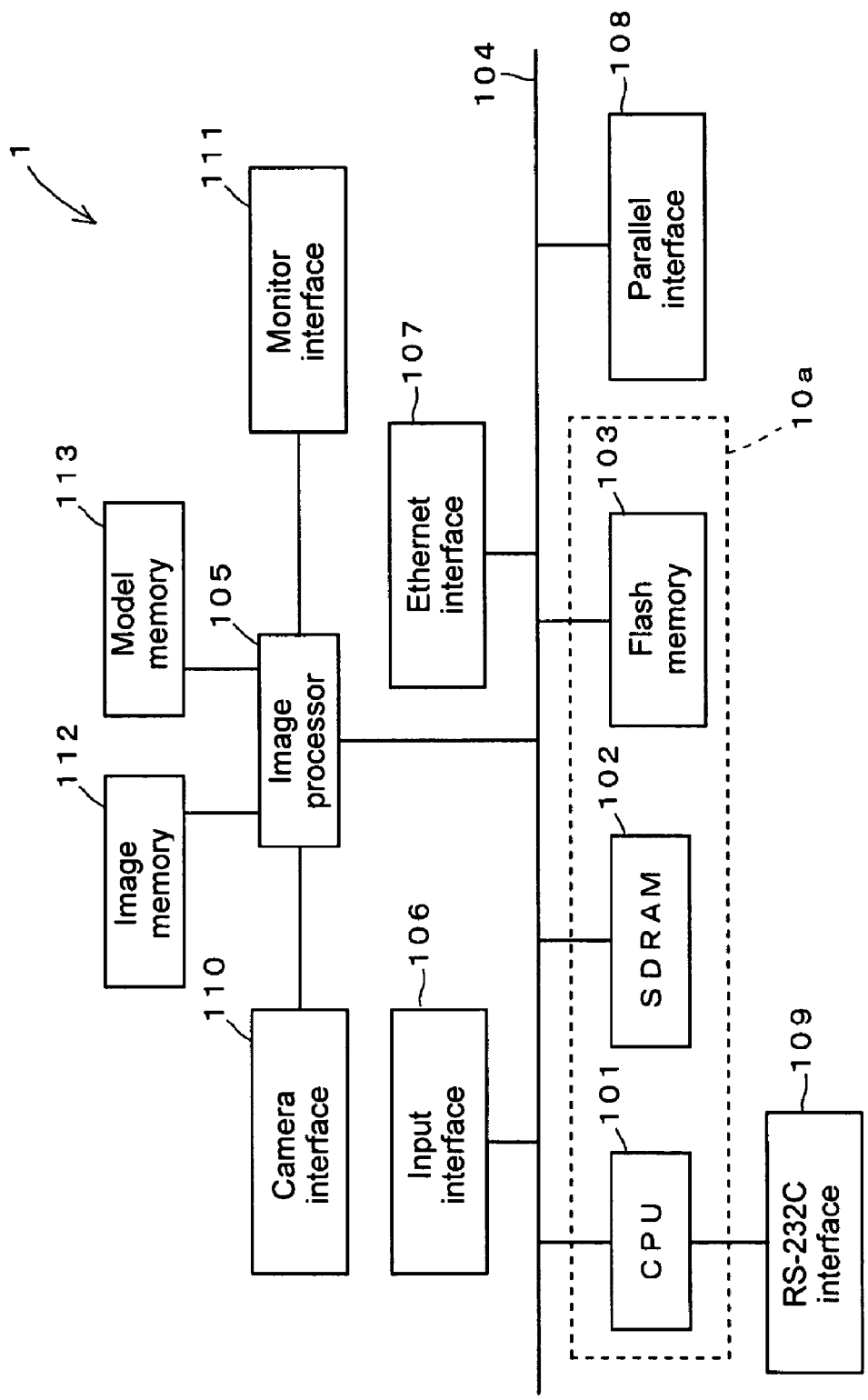
FIG. 3 shows a block diagram showing the arrangement of an image processing apparatus.

The image processing apparatus 1 comprises a set of components installed in a box-like housing 10 as shown in FIG. 3. The housing 10 is connected to a television camera 11 (referred to as a camera 11 hereinafter) and a console 12, thus forming a fundamental arrangement. Alternatively, the image processing apparatus 1 may be connected with other personal computers (which are different from the terminal 2 shown in FIG. 1 or 2 and allocated at the same manufacturing site as of the image processing apparatus 1) or a PLC (programmable logic controller), an upper level instrument such as a PLC (programmable logic controller), and a monitor.

FIG. 3 is a block diagram of the image processing apparatus 1. The image processing apparatus 1 includes a controller 10a comprising CPU 101, an SDRAM 102, and a flash memory 103. The CPU 101 is connected to an RS-232C based interface 109 and via a bus 104 to an image processor 105, an input interface 106, an Ethernet (registered trade name) interface 107, and a parallel interface 108. The image processor 105 is connected with a camera interface 110, a monitor interface 111, an image memory 112, and a model memory 113.

The camera interface 110 is provided for receiving a video signal from the camera 11. The image processor 105 is an image processing dedicated LSI including a binary circuit, an edge extractor circuit, and a correlation operator circuit and arranged for processing at high speeds the image received from the camera interface 110. Also, the image processor 105 includes a function for generating an image to be displayed (e.g., an image mixing circuit). The image to be displayed is transferred via the monitor interface 111 to a monitor (not shown).

The image memory 112 has areas assigned for storage of the data of display images and input images received from the camera interface 110. The model memory 113 is provided for storage of model images used as the models for the action of pattern matching process of the correlation operator circuit. The SDRAM 102 is used as a work memory for the CPU 101. The flash memory 103 is provided for storage of programs for operating the CPU 101 and parameters for the image processing. The flash memory 103 has areas assigned for storage of the images received in the past for measurement and the results of the measurement.

The input interface 106 is provided for receiving an input signal from the console 12. The parallel interface 108 and the RS232C based interface 109 may be connected to upper level peripherals (e.g., a PLC and personal computers provided at the manufacturing site as described previously) and their data to be passed are different in the format from each other. The RS232C based interface 109 is provided for exchanging mainly numerical data. The parallel interface 108 is provided for receiving commands from the upper level instruments and transmitting state signals to the same.

The Ethernet (registered trade name) interface 107 (referred to as an interface 107 hereinafter) is provided for communication over the Internet 3. In response to a command for transmission of image data, which will be explained later in more detail, the CPU 101 retrieves the image to be displayed from the image processor 105 and generates a response including the image to be displayed which is then transmitted from the interface 107. The response includes no data for controlling the action of display or data exchange for the peripherals and its format may be modified as desired. The format of the response may be predetermined prior to the image processing action by a desired setting scheme.

In action, the image processor 105 receives a digital form of image of interest via the camera interface 110 and carries out its action of processing the received image. The action includes, for example, extracting the edge data from the received image and measuring its coordinate points and gray scale direction. Also, the action includes a step of pattern matching between the received image and the model saved in the model memory 113 to determine the location of an object in the image.

The result of measurement is transferred from the image processor 105 to the CPU 101. The CPU 101 repeats an action of further detailed measurement or judging from the measurement whether the object is good or not. The result of measurement may be transferred via the interfaces 108 and 109 to external instruments or saved in the flash memory 103.

Simultaneously, the image processor 105 when receiving a command from the CPU 101 generates an image to be displayed on the monitor. The format of the display image may arbitrarily be determined or preferably predetermined prior to the image processing action by a desired setting scheme. The image to be displayed may be one of input image or a modification (binary image or edge image) of the image generated during the image processing action. Alternatively, the display image may be a histogram or a graphic profile of the measurement or a combination of the image and an indicator such as a pointer for marking the extraction location of the object. Moreover, a menu of setting items may be displayed for ease of determining the settings including the parameters and the mode of action.

The remove peripheral 2 is equipped in advance with software for the image processing action. The software allows the peripheral 2 to fetch the display image from the image processing apparatus 1 at the timing substantially equal to the display of the image and display the same at a desired format on its monitor before starting the image processing action. The format of the display image can arbitrarily be modified at the peripheral. At the remote peripheral 2, the action of determining the settings on the image processing apparatus 1 or downloading the measurement or history of the actions saved in the image processing apparatus 1 can be conducted with entry of peripheral 2 (keyboard or mouse etc.).

Figure 4:
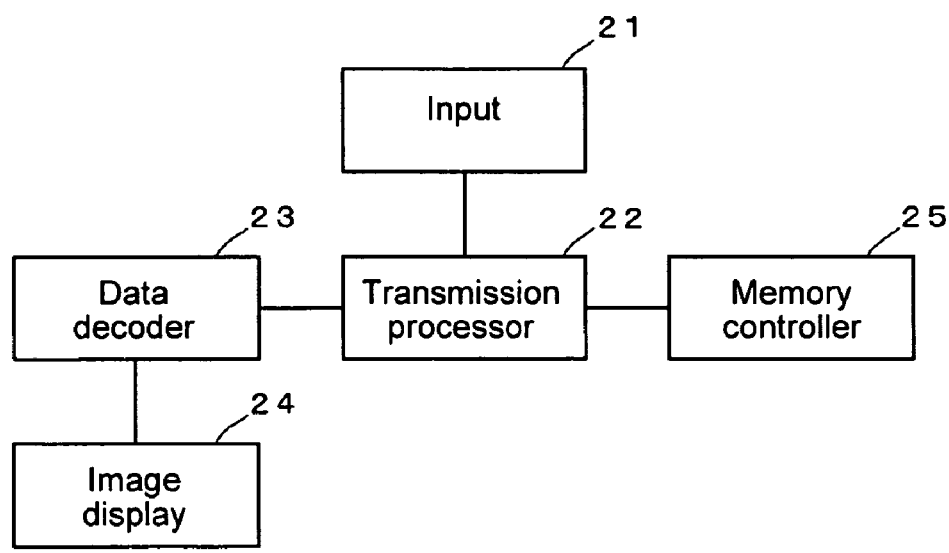
FIG. 4 shows a block diagram showing the functional arrangement of a peripheral.

FIG. 4 illustrates a functional arrangement of the peripheral 2 controlled by the dedicated software. The program of the software is installed directly from a given storage medium or downloaded from the Internet 3 before saved in the hard disk drive of the peripheral 2.

As shown, an entry 21 is provided for receiving commands and settings desired by the user. A communication processor 22 is provided for exchanging data with the image processing apparatus 1. A data decoder 23 is provided for converting the data received from the image processing apparatus 1 into a feasible format. This function is needed because the data received from the image processing apparatus 1 is commonly compressed or encrypted. An image display 24 is provided for extracting a display image from the decoded data and displaying the display image on its monitor screen.

A memory controller 25 is also provided for reading or writing data on a memory of the peripheral 2 for executing the communications. For example, the display image data or measurement data received by the communication processor 22 may be saved or the data for transmission to the image processing apparatus 1 may be registered in advance.

The communication processor 22 in the embodiment supplies the image processing apparatus 1 with a command of the HTTP protocol format as the predetermined setting format prior to the image processing action and receives a response of the same format to obtain the image to be displayed. Because the HTTP protocol is a stateless protocol, it can not be interrupted by the firewall 4 or the router 5 which limits the reception of external data. The format may arbitrarily be modified as desired.

In the embodiment, the display image produced by the image processing apparatus 1 is decimated depending on the rate of the processing action at the peripheral 2 or the speed of data transmission so that its update version is carried on the data at each transmission. This allows the user at the peripheral 2 to monitor the same display image as viewed by the user at the image processing apparatus 1 with substantially no time lag.

Figure 5:
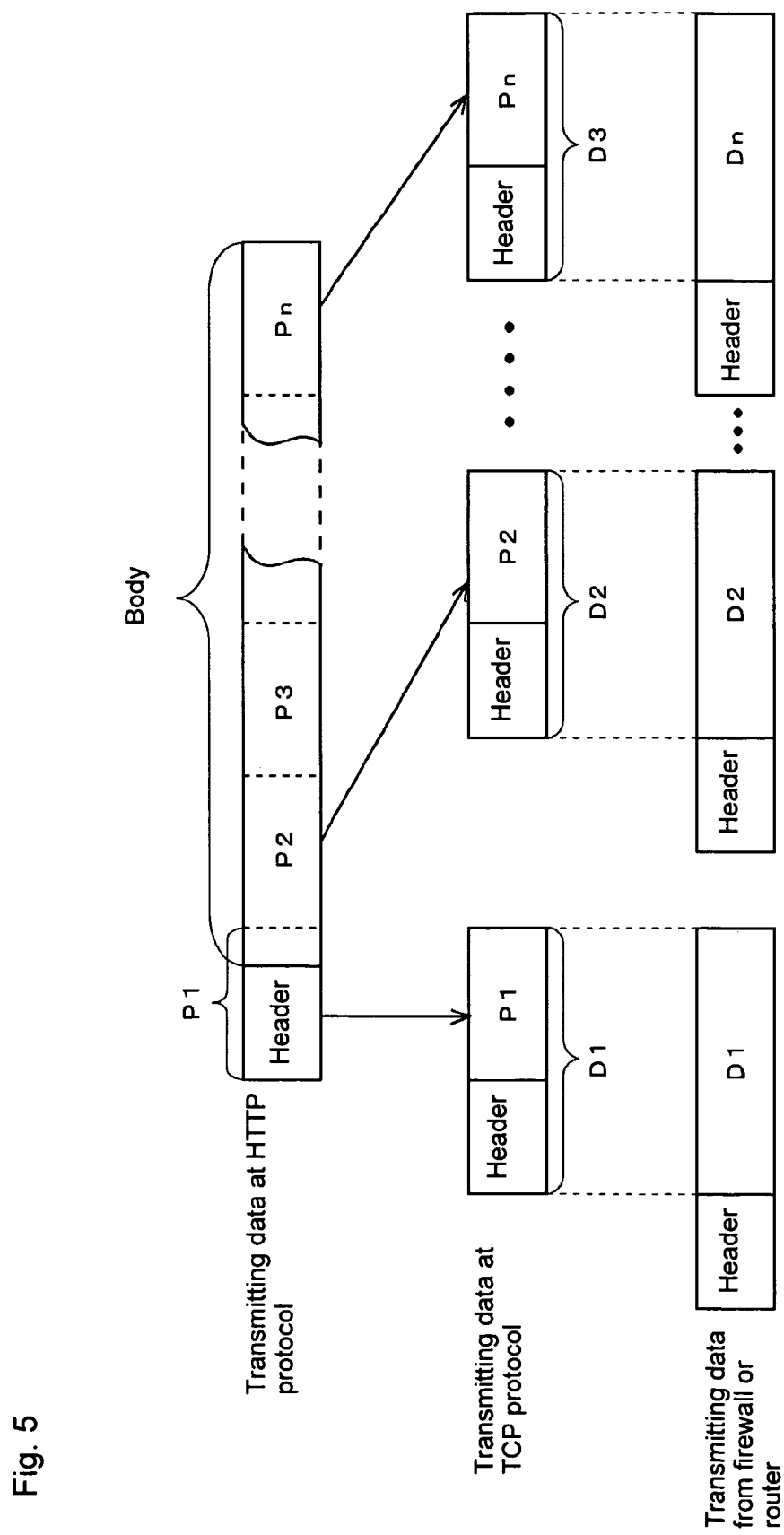
FIG. 5 shows an explanatory illustration of a structure of response data transmitted from the image processing apparatus to the peripheral.

FIG. 5 illustrates a series of steps for transmitting the data from the image processing apparatus 1 to the peripheral 2. The data produced by the image processing apparatus 1 has a header coupled to the body of information including the (display) data to be transmitted at the HTTP protocol. The header contains a message indicative that the protocol is of the HTTP format and a type of the data. The header will be referred as an HTTP header hereinafter.

The data of the HTTP protocol is divided into packets P1, P2, ... and Pn of the TCP format. Each of the packets has a header carrying the port numbers of the transmitter and the receiver as well as the sequence number of its packet. The header will then be referred to as a TCP header hereinafter. Also in the figure, the TCP header is followed by data segments D1, D2, ... and Dn to be transmitted.

The HTTP header is attached to only the first packet P1.

When receiving the data segments D1, D2, ... and Dn, their TCP headers are examined by the firewall 4 or the router 5. Simultaneously, the HTTP header attached to the first data D1 is also examined. When the HTTP header contains the message of responding to the command from the peripheral 2, the firewall 4 or the router 5 judges that the data segment D1 is an eligible data to be passed and attaches a given header to the data segment D1 for entrance into the system. Then, the succeeding data segments D2 to Dn are accepted as eligible data through examining the port number and the sequence number in the TCP header and attached with given headers for entrance into the system.

According to the TCP protocol, the TCP header once received is provided with a message indicative of the receipt of the data has been completed and returned back from the receiver computer to the transmitter computer so that the transmission and receipt of the data is acknowledged. This action will be referred to as receipt completion message hereinafter.

Figure 6:
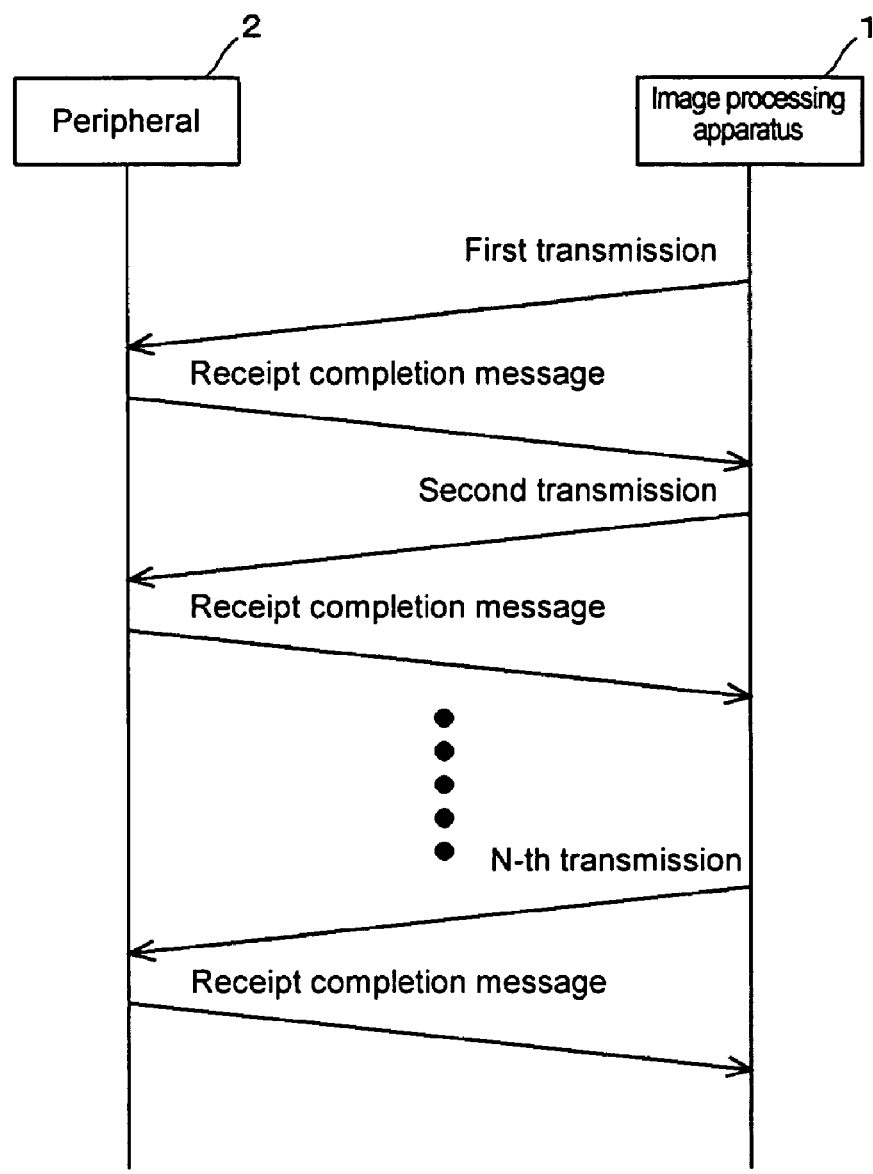
FIG. 6 shows an explanatory illustration showing the exchanging of TCP based data between the image processing apparatus and the peripheral.

FIG. 6 illustrates the transmission of the data shown in FIG. 5 from the image processing apparatus 1 and the transmission of the message from the peripheral 2 at the TCP protocol. As explained, the n packets of the data are transmitted from the image processing apparatus 1. The image processing apparatus 1 waits for receiving the receipt completion message from the peripheral 2 after the transmission of each packet of the data. The next packet of the data is transmitted only when the receipt completion message is received. Accordingly, the transmission of the data can be made depending on the rate of the processing action at the peripheral 2 or the speed of the transmission.

FIGS. 7 to 13 illustrate different actions of controlling the communications between the image processing apparatus 1 and the peripheral 2 (including an action of controlling the peripheral 2 for image display). Each action starts with a size of image data at the HTTP protocol transmitted from the image processing apparatus 1 to the peripheral 2. In any case, the exchange of data shown in FIG. 6 is repeated several times between the image processing apparatus 1 and the peripheral 2 to complete one cycle of the transmission of the HTTP data.

Figure 7:
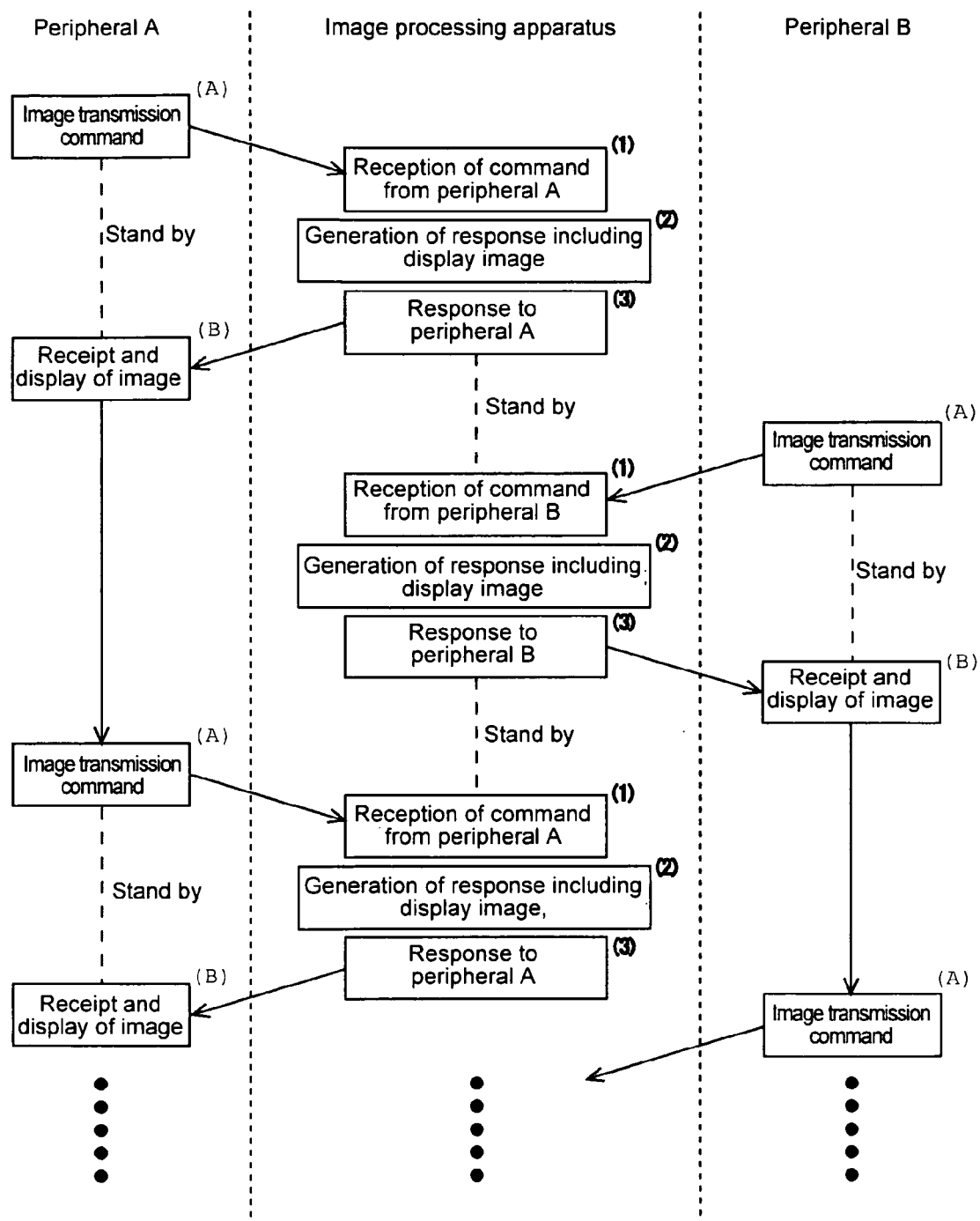
FIG. 7 shows an explanatory illustration showing steps of the communication controlling action between the image processing apparatus and the peripherals.
Figure 8:
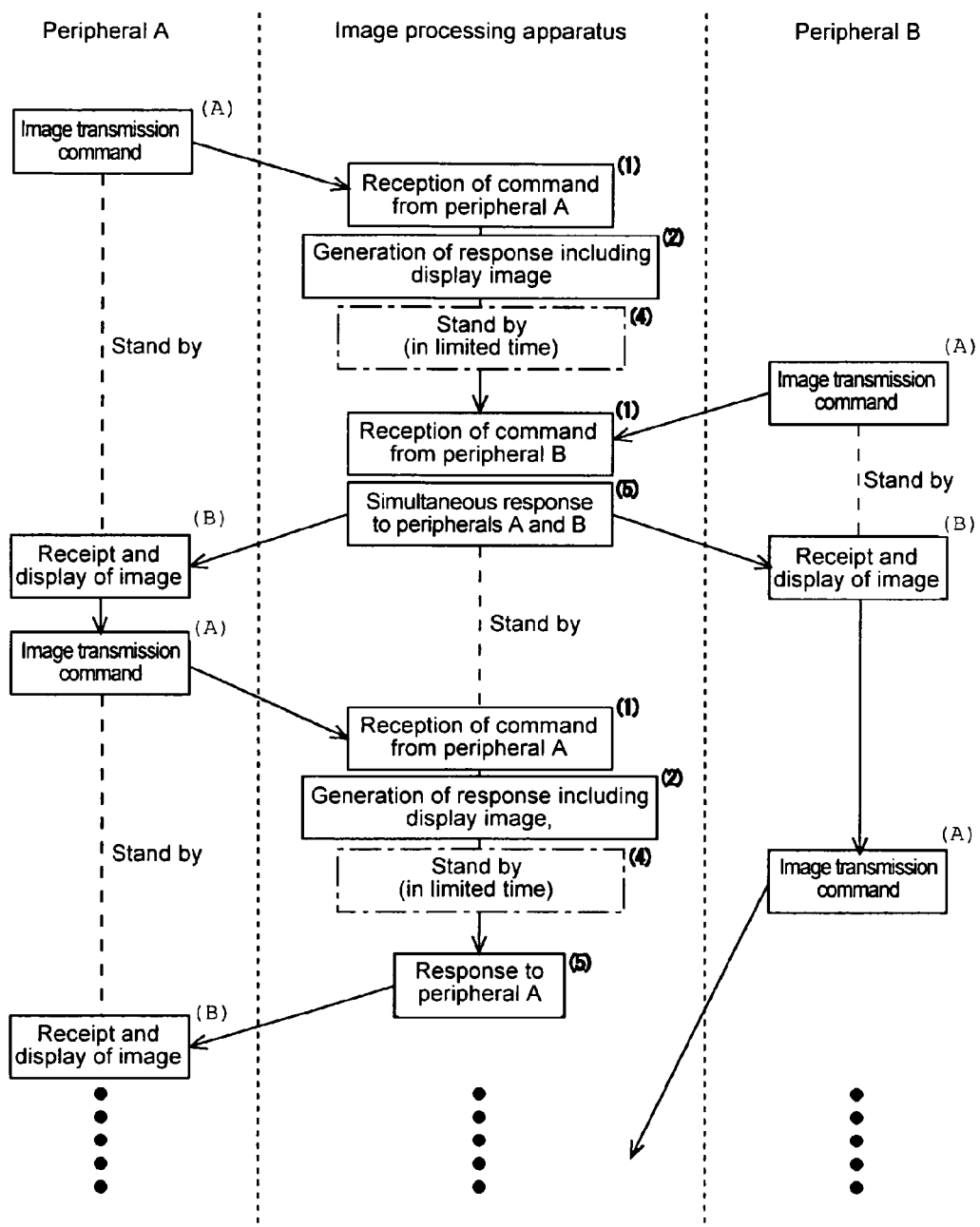
FIG. 8 shows an explanatory illustration showing steps of the communication controlling action between the image processing apparatus and the peripherals.
Figure 9:
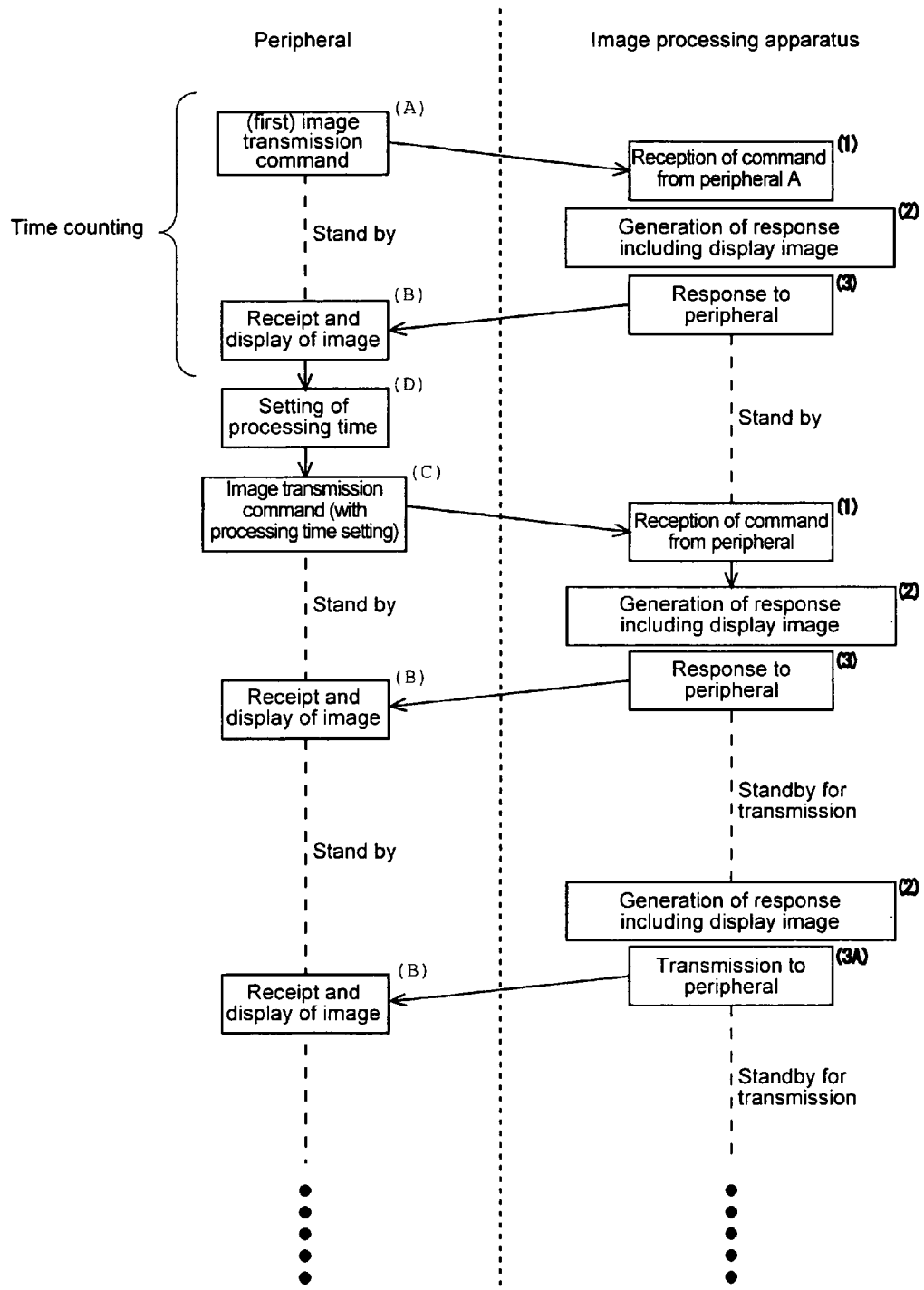
FIG. 9 shows an explanatory illustration showing steps of the communication controlling action between the image processing apparatus and the peripheral.
Figure 10:
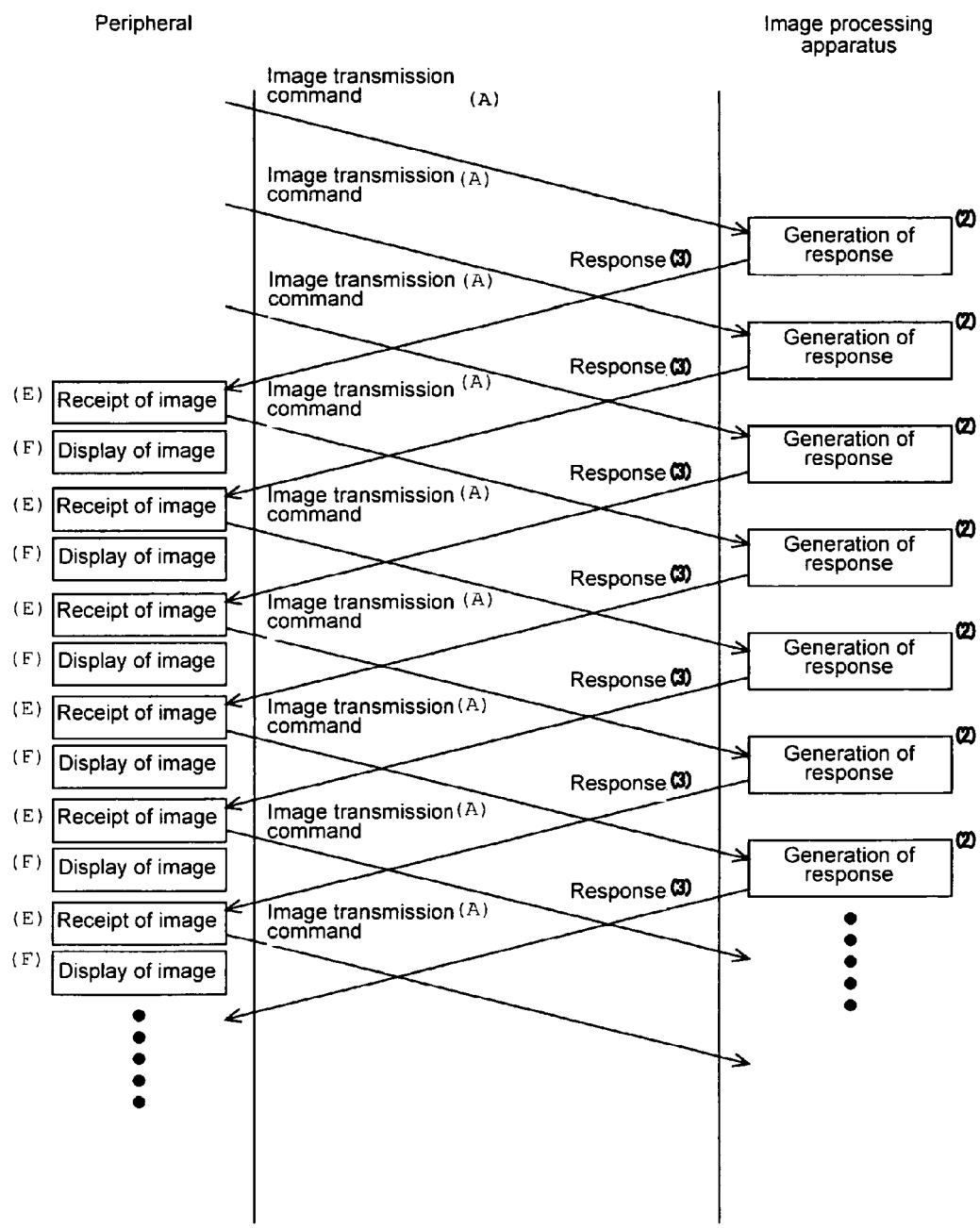
FIG. 10 shows an explanatory illustration showing steps of the communication controlling action between the image processing apparatus and the peripheral.
Figure 11:
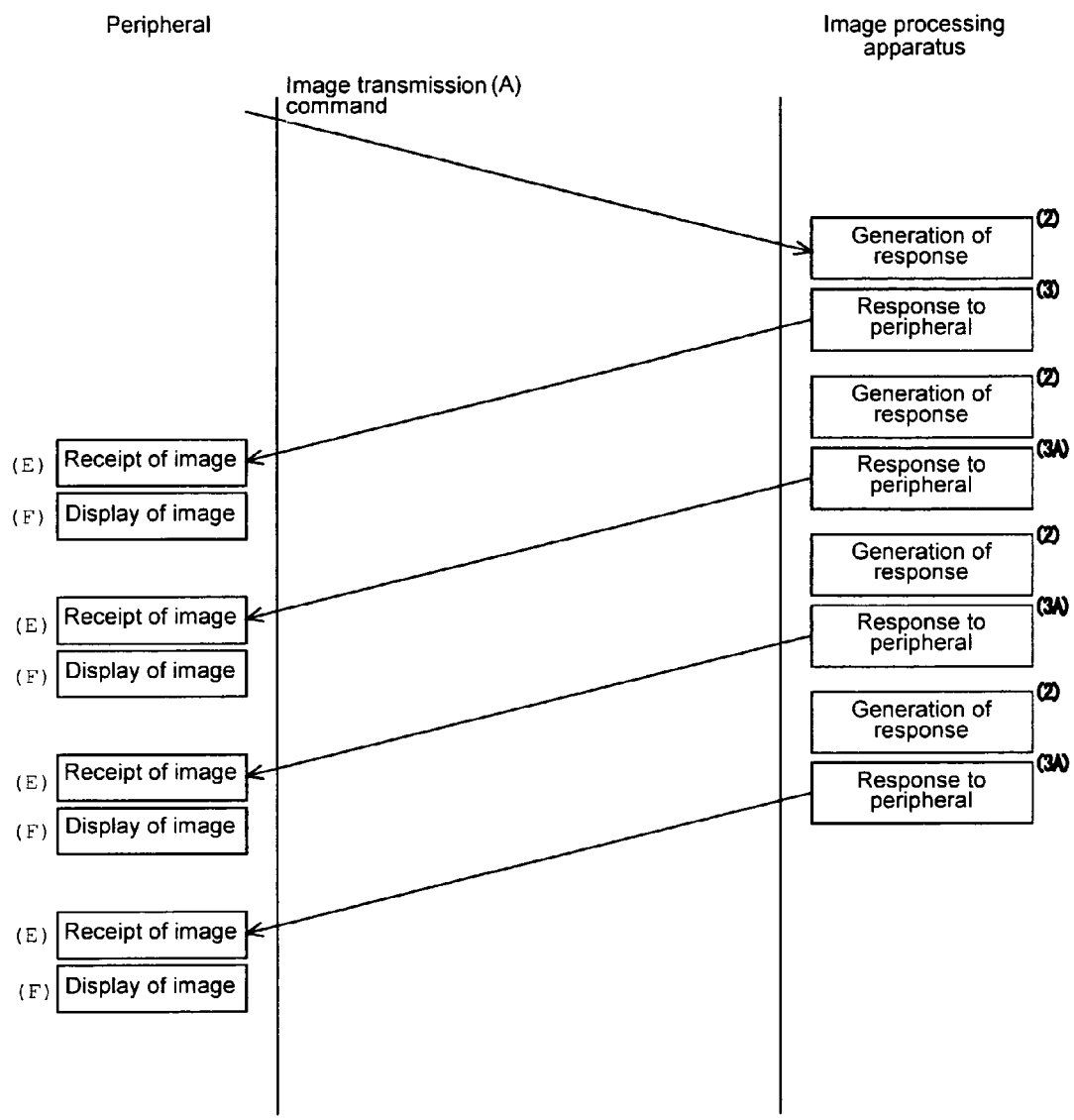
FIG. 11 shows an explanatory illustration showing steps of the communication controlling action between the image processing apparatus and the peripheral.
Figure 13:
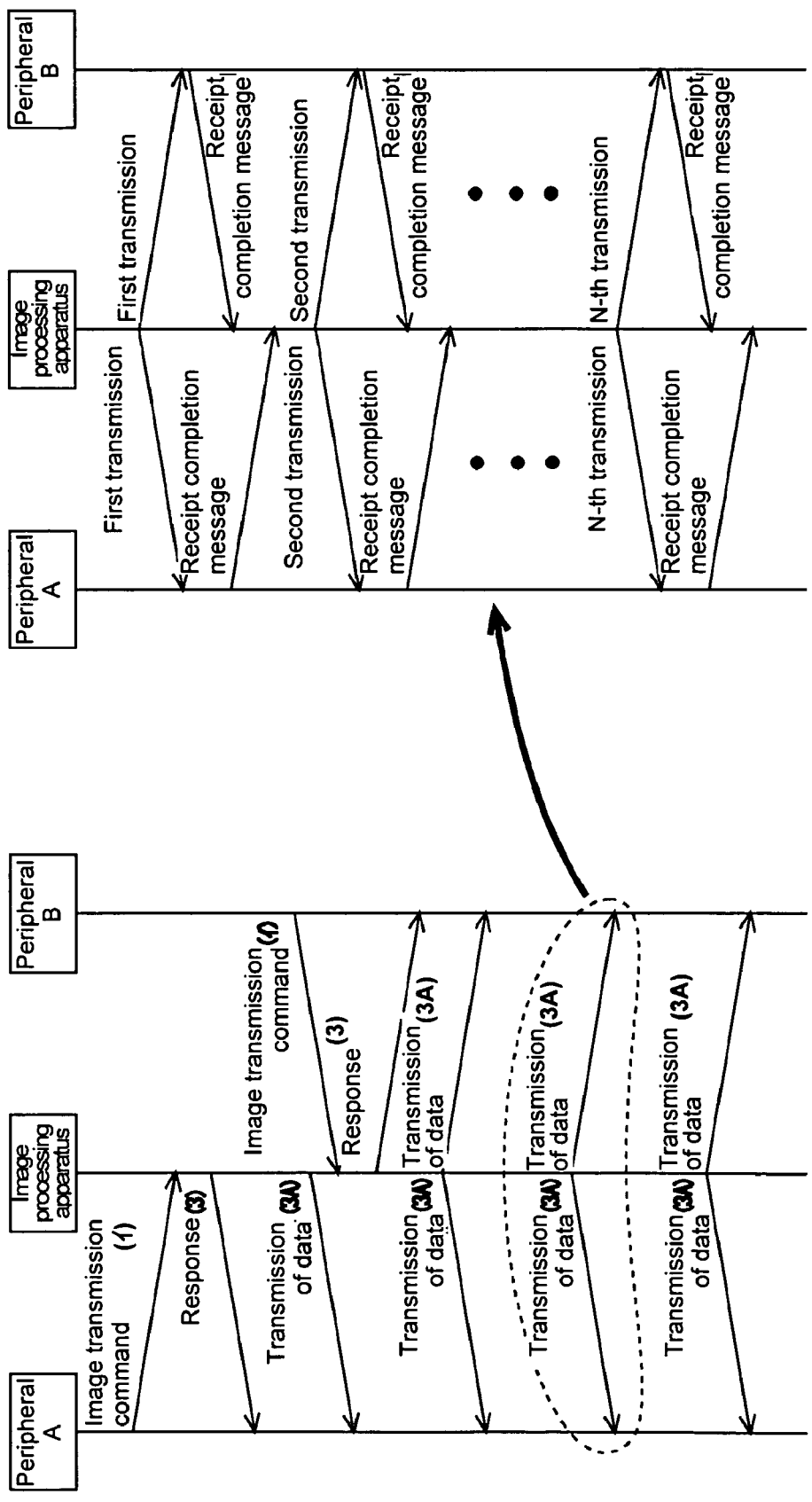
FIG. 13 shows an explanatory illustration showing steps of the communication controlling action between the image processing apparatus and the peripherals.

In FIGS. 7, 8, and 13, the single image processing apparatus 1 is connected with two of the peripherals 2A and 2B. In FIGS. 9, 10, and 11, the single image processing apparatus 1 is connected to the single peripheral 2. As shown, the steps of action at the peripheral 2 are denoted by the alphabetical letters A, B, C, and so on while the steps of action at the image processing apparatus 1 are denoted by the numerals 1, 2, 3, and so on. Like steps are denoted by like letters or numerals throughout the figures. The following description is hence made using the alphabetical letters and the numerals.

FIG. 7 illustrates the dispatching of a command for receiving the image to be displayed (referred to as an image transmission command) from the peripheral 2 to the image processing apparatus 1 (Step A). When receiving the image transmission command, the CPU 101 in the image processing apparatus 1 drives the image processor 105 and the interface 107 to retrieve the image to be displayed from the image memory 112 and transmit a respond including the display image to the peripheral 2 (Steps 1, 2, and 3). Meanwhile, the display image is subjected to compression and encryption process. The display image may be at least one of the latest images or a set of images sequenced from the newest.

Upon receiving the response to its image transmission command from the image processing apparatus 1, the peripheral 2 display the display image (Step B). The peripheral 2 repeats the dispatch of the image transmission command, the receipt of the response, and the display of the image to be displayed. The image transmission command is generated at the HTTP protocol as described previously. The image processing apparatus 1 performs its action in response to the image transmission command independently regardless of the preceding or succeeding command or the content of the command. The peripheral 2 can hence produce an image transmission command at desired intervals of time according to its processing capability to obtain and display the latest image to be displayed. Since the current computers and networks are enhanced in the speed of data transmission, the time lag between the generation of an image to be displayed in the image processing apparatus 1 and the display of the display image in the peripheral 2 will be as short as negligible. This allows any user at the remote location to monitor the image at substantially the same timing as at the manufacturing site.

FIG. 8 illustrates the transmission of a response to the image transmission command from the image processing apparatus 1 to the peripheral 2. In this action, the image processing apparatus 1 waits until a predetermined length of time is elapsed from the receipt of the image transmission command (Step 4). During the length of waiting time, no response to the image transmission command from any other peripheral 2 is made. After the predetermined length of time is elapsed, the image processing apparatus 1 generates and transmits at once the responses to the first image transmission command from the peripheral 2 and the other image transmission commands from the other peripherals 2 (Step 5).

Also in this action, a common response to the peripherals 2 can be generated by the image processing apparatus 1 of which the controlling action is thus eased. Particularly, the response is transmitted to the peripheral 2 which dispatches the first image transmission command and the other peripherals 2 which dispatch their image transmission commands during the waiting time. Accordingly, even if the dispatch of the image transmission command from, e.g., the peripheral B is delayed, it will never affect or retard the updating of the images to be displayed in the other peripherals 2. Also, the peripheral B which delays the dispatch of the image transmission command can certainly receive the response after the waiting time thus having no error in the displaying of the image.

In the action shown in FIGS. 7 and 8, the peripheral 2 has to repeat the action of dispatching the image transmission command. FIG. 9 illustrates the peripheral 2 dispatching the image transmission command fundamentally two times. After dispatching the first image transmission command (Step B), the peripheral 2 measures the duration of time from the dispatch of the image transmission command via the receipt of the response the image processing apparatus 1 to the completion of the display of the image. Then, the period of time needed for processing before the receipt of the image to be displayed is calculated from the measurement (Step D) and the second image transmission command is dispatched including the calculated processing period (Step C).

The image processing apparatus 1 performs the responsive action once when receiving the first image transmission command which carries non of the processing period as equal to that shown in FIGS. 7 and 8. When receiving the second image transmission command which includes the processing period, the image processing apparatus 1 performs the directly responsive action and repeats the action of generating a response after the processing time is elapsed and transmits the response to the peripheral 2 (Step 3A). After dispatching the second image transmission command, the peripheral 2 waits for receiving a not-direct response from the image processing apparatus 1 and updates the display of the image whenever receiving the response (Step B).

In the above action, any not-direct response (Step 3A) other than the direct response to the image transmission command includes the HTTP header which is identical to that attached to the directly response to the image transmission command. Accordingly, the not-direct response can be passed across the firewall 4 or the router 5 to the peripheral 2. In this action, the latest image to be displayed can be transmitted whenever the processing time has been elapsed.

In FIG. 9, the image processing apparatus 1 is connected to the single peripheral 2. When two or more of the peripherals 2 are connected, the processing time is examined at every peripheral 2 before the not-direct response is transmitted (Step 3A).

FIGS. 10 and 11 illustrate the dispatching of the image transmission command and the transmission of the response schematically denoted by the arrows while the step B (of receiving and displaying the image) shown in FIGS. 7 to 9 is separated into two sub steps E and F.

The peripheral 2 shown in FIG. 10 has dispatched several image transmission commands (two times in the figure) following the first image transmission command before receiving the response to the first image transmission command. Then, when the action of receiving the response to the preceding image transmission command is completed (Step E), the dispatching of the next image transmission command is carried out before the action of displaying the image starts (Step F). As the dispatching of the next image transmission command is conducted before the action of displaying the image received in response to the preceding image transmission command, the interval of time between two consecutive receipts of the image can be minimized. Accordingly, even when the display action of the image processing apparatus 1 is fast, it can be responded by the peripheral 2 without delay. When the image processing apparatus 1 shown in FIG. 10 is connected to two or more of the peripherals 2, it can simultaneously perform the action of responding two or more image transmission commands received within a period of time similar to the action shown in FIG. 8.

FIG. 11 illustrates the peripheral 2 dispatching the image transmission command once. In turn, the image processing apparatus 1 generates a response (Step 2) and transmits the same (Step 3). It also generates a not-direct response (Step 2) and repeats the action of transmission (Step 3A). This action is equivalent to the action in response to the image transmission command with the processing time shown in FIG. 9.

The responsive action shown in FIG. 9 includes the steps 2 and 3A spaced by an interval corresponding to the processing time. However, the responsive action shown in FIG. 11 is carried out using the controlling action at the TCP format shown in FIG. 6. The controlling action will be explained in more detail referring to FIG. 12.

Figure 12:
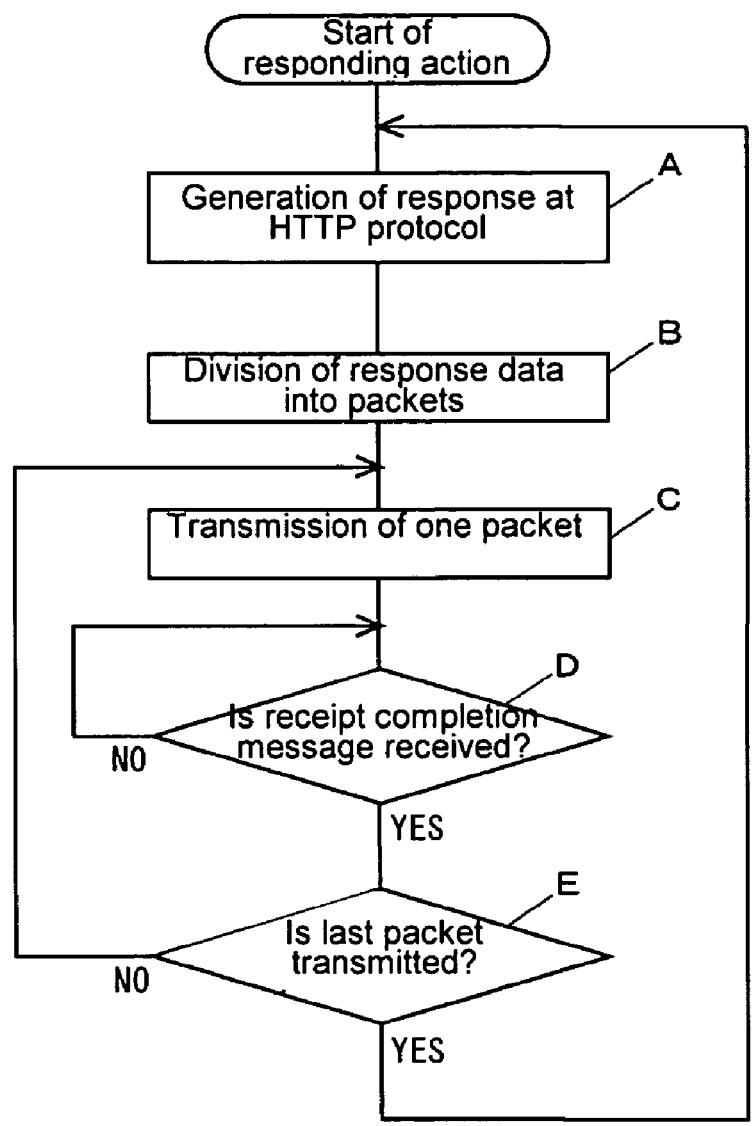
FIG. 12 shows a flowchart illustrating the action of the image processing apparatus in response to the steps shown in FIG. 11.

The controlling action shown in FIG. 12 starts upon the receipt of the image transmission command from the peripheral 2. At the first step A, the HTTP header is attached to the body including the latest image to be displayed to construct a response data. This is followed by Step B where the response data is divided into packets. The TCP header is attached to each packet which is then transmitted (Step C). When the receipt completion message is received, the transmission of the packet is repeated (Step D). Steps A to D are equivalent to the action shown in FIG. 6. In other words, each responsive action in the foregoing description comprises Steps A to D.

The action returns to Step A for generating another response when it is judged "yes" at Steps D and E after the receipt completion message for the last packet is received. Similarly, the repeating of Steps A to E allows each response to be generated and transmitted upon the peripheral 2 completing the receipt of the preceding response.

At the controlling action, the peripheral 2 can receive the images to be displayed from the image processing apparatus 1 at intervals of time determined depending on the rate of its processing action and the speed of the transmission. Since the response includes the latest image to be displayed at the time, it allows the peripheral 2 to display the image at substantially the same timing as of the image processing apparatus 1.

FIG. 13 illustrates the same controlling action as shown in FIG. 11 with two or more of the peripherals 2 (two A and B in the figure). The controlling action at the HTTP format (Step 1 in the figure) and the controlling action at the PCT format (Step 2 in the figure) are correlated. In the action, the first responsive action to the image transmission command is carried out at the timing of receiving the image transmission command. Then, the responsive action is conducted to transmit the common response to both the peripherals A and B.

The TCP format controlling action involves, as shown in FIG. 13(2), waiting for receiving the receipt completion message from each of the peripherals 2A and 2B after every transmitting action and repeats the transmitting action only when a given number of the receipt completion messages have been received. This may cause the transmitting action to be repeated depending on the processing speed of the slowest peripheral 2. However, as the transmitting action is carried out at once for all the peripherals 2, its efficiency can remain not declined. It is preferable to carry out the transmitting action for the peripherals 2 excluding the slowest peripheral 2 which fails to dispatch the receipt completion message after a predetermined length of time is elapsed.

Figure 14:
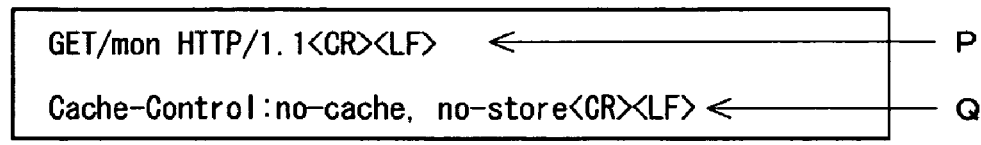
FIG. 14 shows an illustration showing a structure of the image transmission command.

The structure of each data (at the HTTP protocol format) used in the actions will now be described. FIG. 14 illustrates a data structure of the image transmission command dispatched from the peripheral 2. The image transmission command consists of two lines of message. The message P at the first line is to command the transmission of the image to be displayed. The message Q at the second line instructs not to cache the response to the image transmission command in a proxy server. As not shown, the messages P and Q are carried in the body and assigned with a dedicated header.

Figure 15:
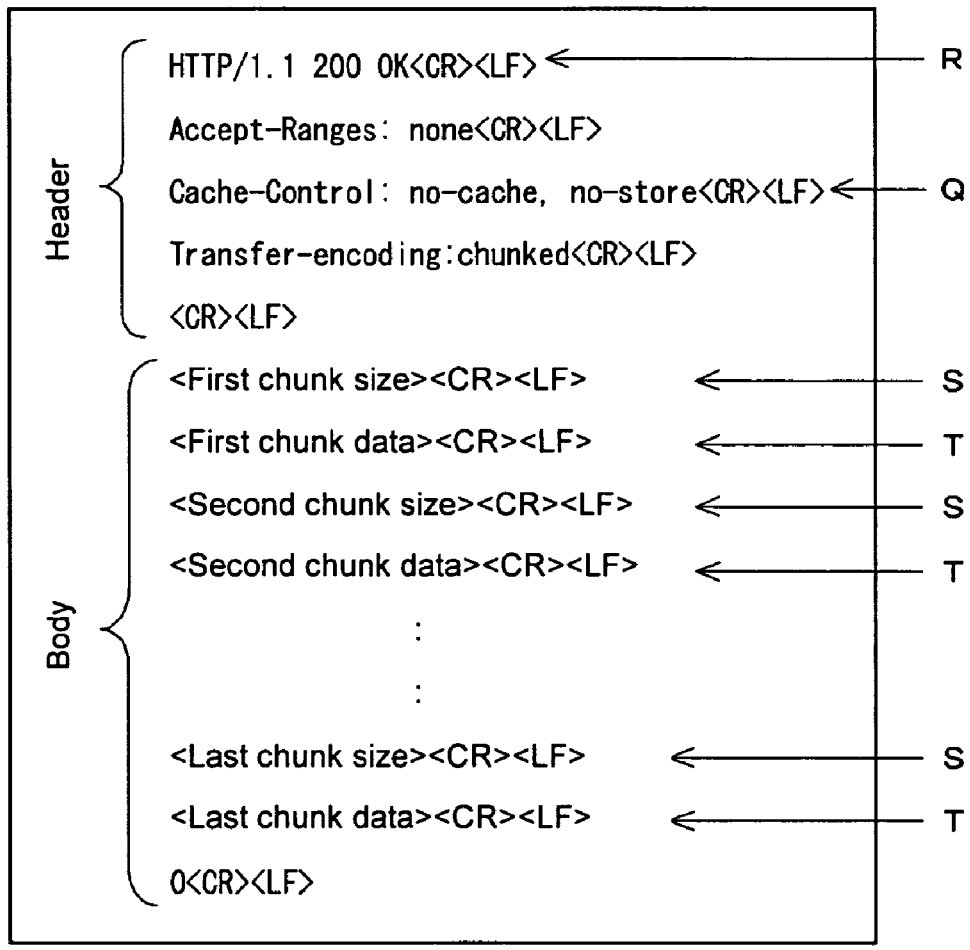
FIG. 15 shows an illustration showing a structure of the response.

FIG. 15 illustrates an example of the response of the image processing apparatus 1 to the image transmission command shown in FIG. 14. The response consists of a header at the HTTP protocol format and a body. The header contains a message R at the first line indicative of receiving of the image transmission command. Carried at the third line is the message Q in the image transmission command.

The body is divided into segments called as chunks. One chunk carries a combination of a data S indicating the size and a data T indicating the content. A group of the data combinations S and T represent one or more images to be displayed. When two or more images are to be carried in the body, the earliest image is a reference image and the remaining images may be expressed by differences from the reference image.

Figure 16:
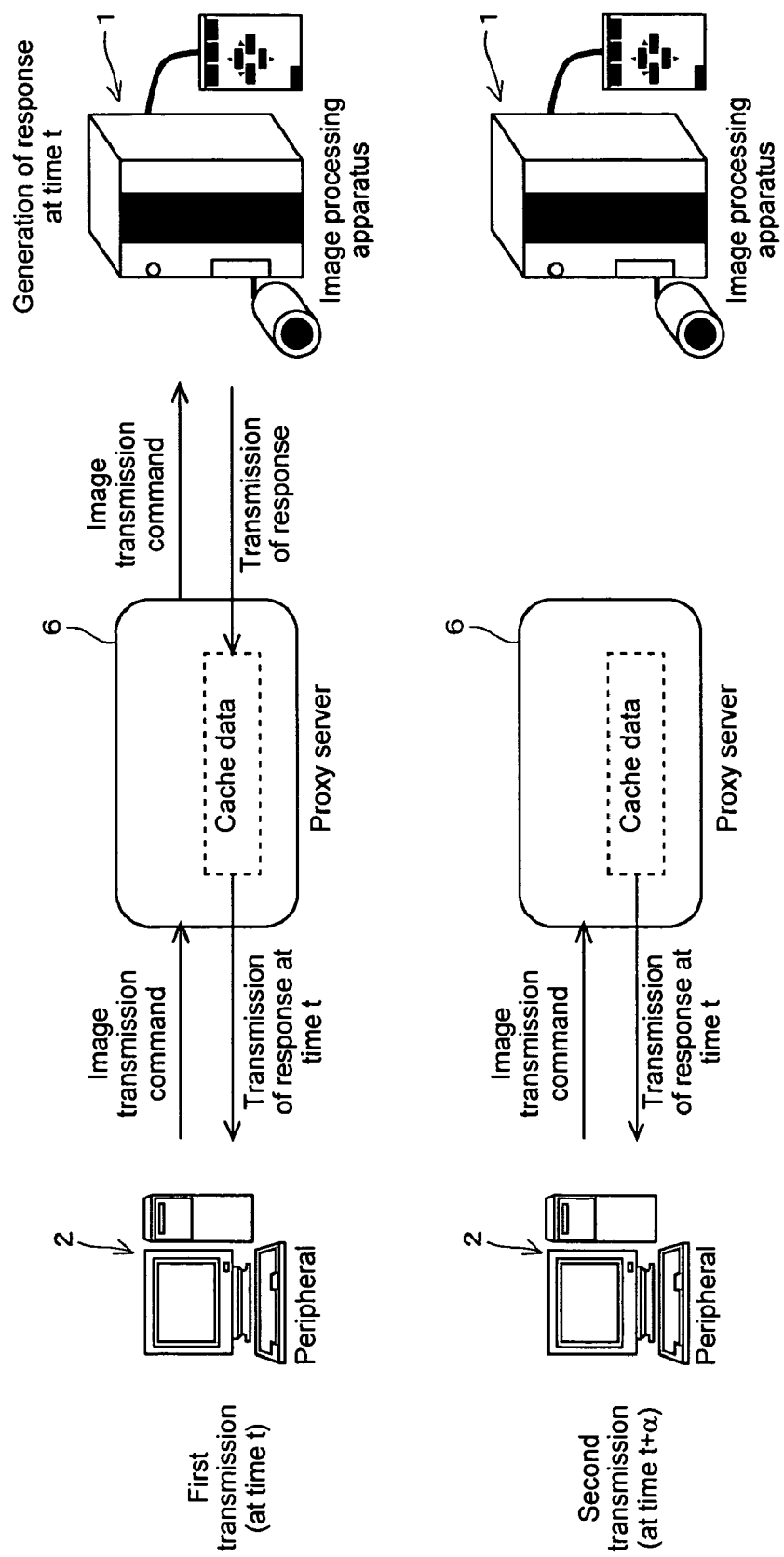
FIG. 16 shows a schematic view showing a drawback when the response is cached into a proxy server.

FIG. 16 illustrates an action of transmitting the image transmission command and its response excluding the message Q. As shown, a proxy server 6 is provided at the entrance or exit of the computer system at the peripheral 2 for connection to the Internet 3.

The first image transmission command is dispatched at the time t from the peripheral 2, passed through the proxy server 6, and received by the image processing apparatus 1 where a response to the command is generated. However, the response generated at the time t is cached into the proxy server 6. The proxy server 6 is designed for, when saving a cache data responding to the command, releasing the cache data but not transferring the command. Accordingly, even when the second image transmission command is dispatched after a length a of time is elapsed from the time t, it is not received by the image processing apparatus 1 and the past response generated at the time t is transmitted. This will prevent the peripheral 2 from updating the display of the image.

Figure 17:
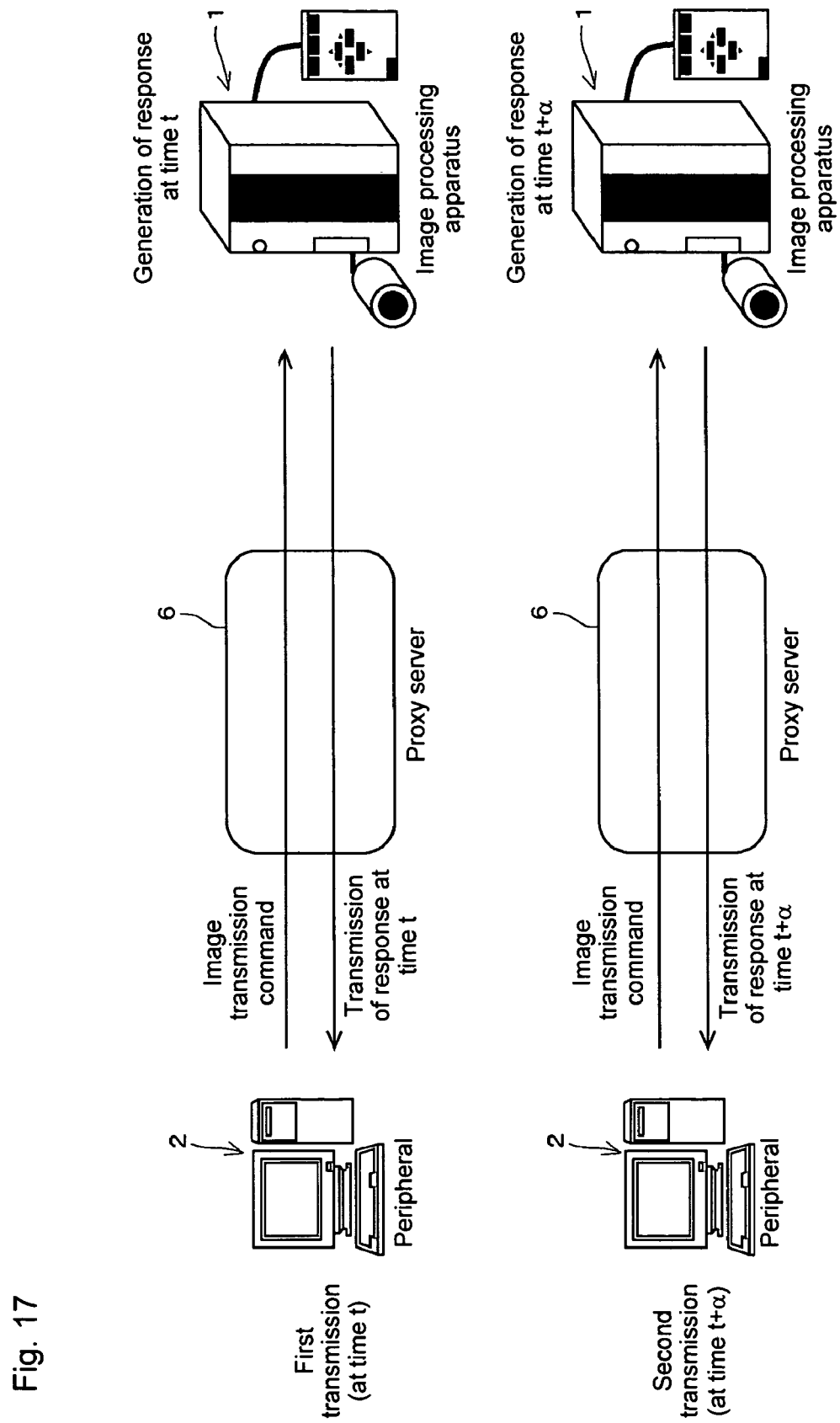
FIG. 17 shows a schematic view showing the communication executed by the steps shown in FIGS. 10 and 11.

FIG. 17 illustrates an action of transmitting the image transmission command and its response including the message Q. In this action, the response to the first image transmission command dispatched at the time t is not cached into the proxy server 6 but transferred to the peripheral 2. The same action as at the time t is repeated in response to the image transmission command dispatched when the length α of time has been elapsed from the time t as followed by transmitting the response generated currently with the image processing apparatus 1. Accordingly, when the image transmission command is repeatedly dispatched from the peripheral 2 as shown in FIGS. 7 to 10, the latest image to be displayed can always be received by the peripheral 2 which thus carries out the updating of the image with no failure.

The action of controlling the display with the setting determined by the peripheral 2 will be described. For determining the setting with the entry 21 shown in FIG. 4, a simulated image of the console 12 in the image processing apparatus 1 (referred to as a simulated commander hereinafter) is generated and displayed on the monitor of the peripheral 2. The setting can thus be determined in the same sequence as at the manufacturing site by the user clicking desired buttons of the simulated commander with the use of a mouse. As the simulated commander is operated, the communication processor 22 dispatches a command for accepting the setting action (a setting acceptance command) to the image processing apparatus 1. The setting acceptance command carries a data about details of the setting action. The image processing apparatus 1 then generates a display image including a menu of the setting items from the data carried by the setting acceptance command for updating the display. The display image is saved in the image memory 112 before transmitted to the peripheral 2 as the response to an image transmission command which follows the setting acceptance command. This allows the peripheral 2 to update the display image as equal to in the image processing apparatus 1.

Figure 18:
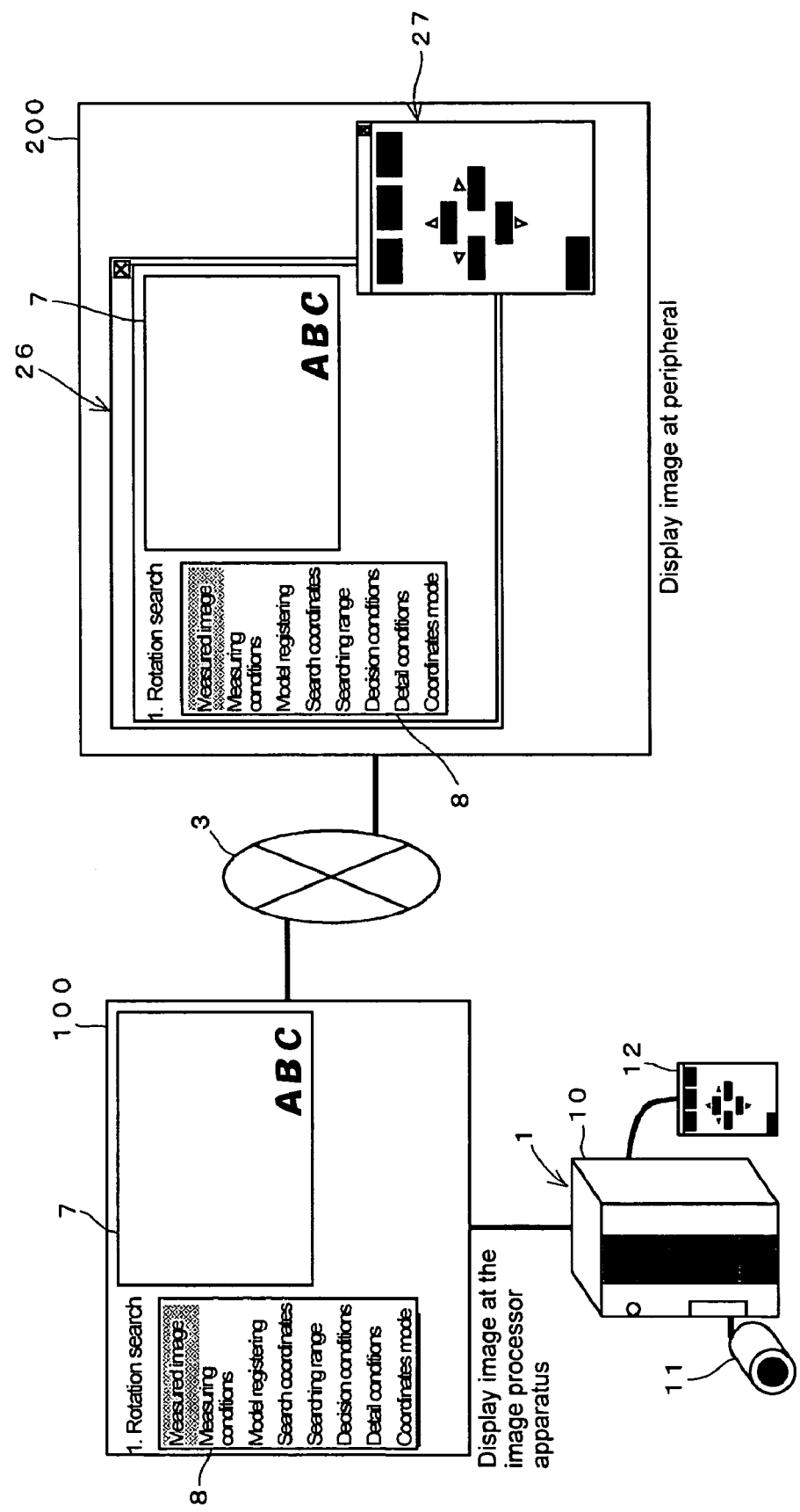
FIG. 18 shows display screens in the relationship between the image processing apparatus and the peripheral.

FIG. 18 illustrates display screens in the relationship between the image processing apparatus 1 and the peripheral 2. This relationship stands when the setting action is started by the peripheral 2. Displayed on a display screen 100 of the image processing apparatus 1 are a menu 8 of the setting items as well as an image 7 of the object to be measured. A display screen 200 of the peripheral 2 provides a window 26 for displaying the image received from the image processing apparatus 1 and a simulated commander 27. The window 26 displays the same display image as on the screen 100 of the image processing apparatus 1 including the image 7 and the menu 8.

When the image processing apparatus 1 is connected with two or more of the peripherals 2, the display image including the menu 8 may be displayed on the other peripherals 2 which remain not operated for the setting. Also, the display image displayed on the other peripherals 2 may exhibit information about the current status of each user. When the peripheral 2 commands the receipt of desired data, the image processing apparatus 1 can retrieve the desired data determined by the setting acceptance command and transmit it as the response to the terminal 2. Accordingly, each user at the peripheral 2 can receive its desired data such as a history of the measurement through downloading.

Figure 19:
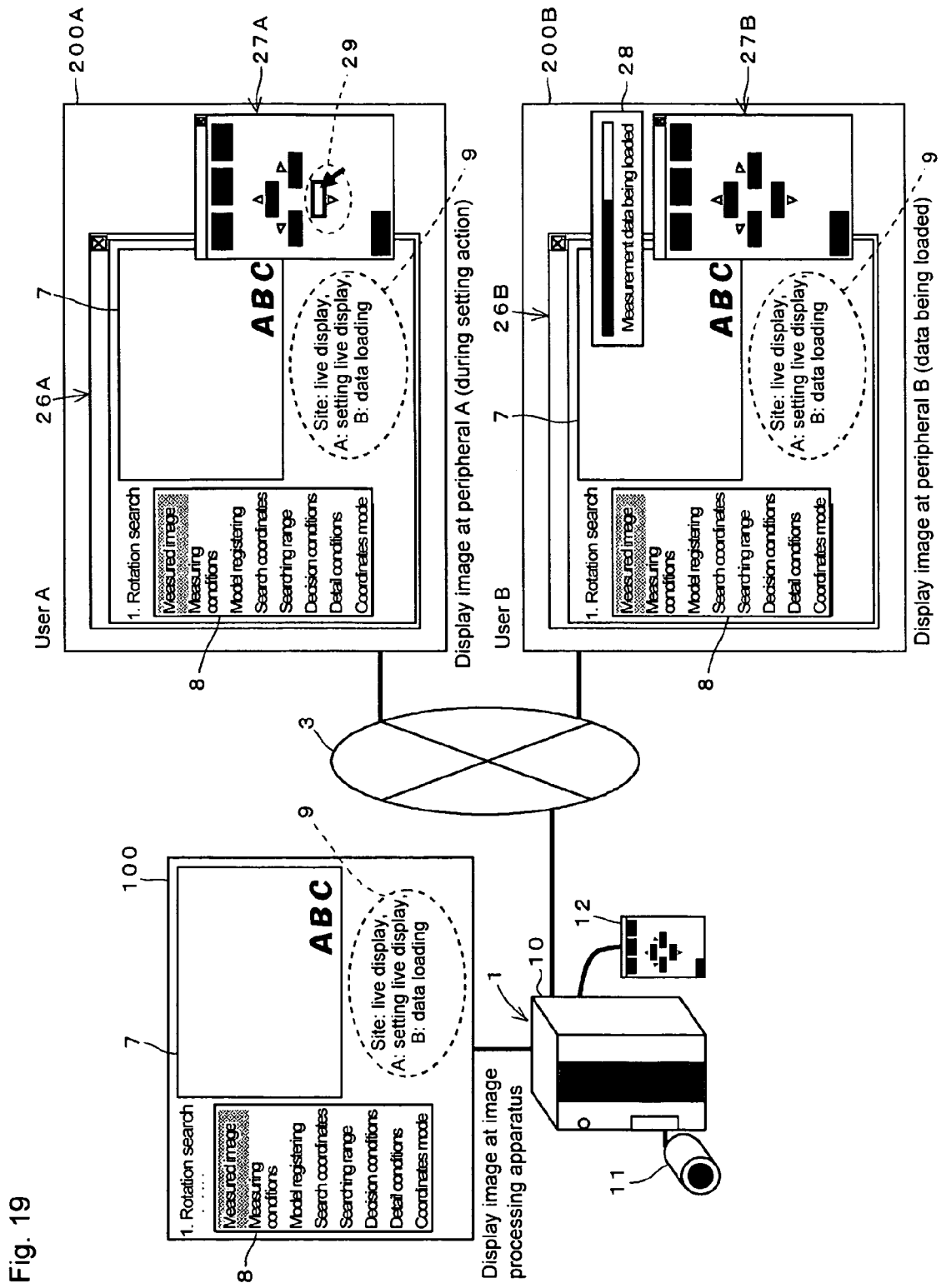
FIG. 19 shows display screens in the relationship between the image processing apparatus and the peripheral.

FIG. 19 illustrates display screens when the image processing apparatus 1 is connected with two peripherals 2A and 2B. One 2A of the two peripherals is used for operating the setting while the other 2B requests downloading of the measurement data. Displayed on the screen of the image processing apparatus 1 are the image 7 of the object to be processed, the menu 8, and a text data 9 indicative of the status of its own and each peripheral 2. The display screens 200A and 200B of the peripherals 2A and 2B provide two windows 26A and 26B respectively where the display image is displayed. The screen 200B of the peripheral 2B also provides another window 28 for displaying the downloading action being conducted. The window 28 is selectively displayed by the peripheral 2B while it is absent on the other screens 100 and 200A. Similarly, the simulated commander 27A is selectively turned on by the peripheral A which commands the setting action, thus permitting the inverted display of relevant buttons or a cursor as denoted by 29 in the figure.

Figure 20:
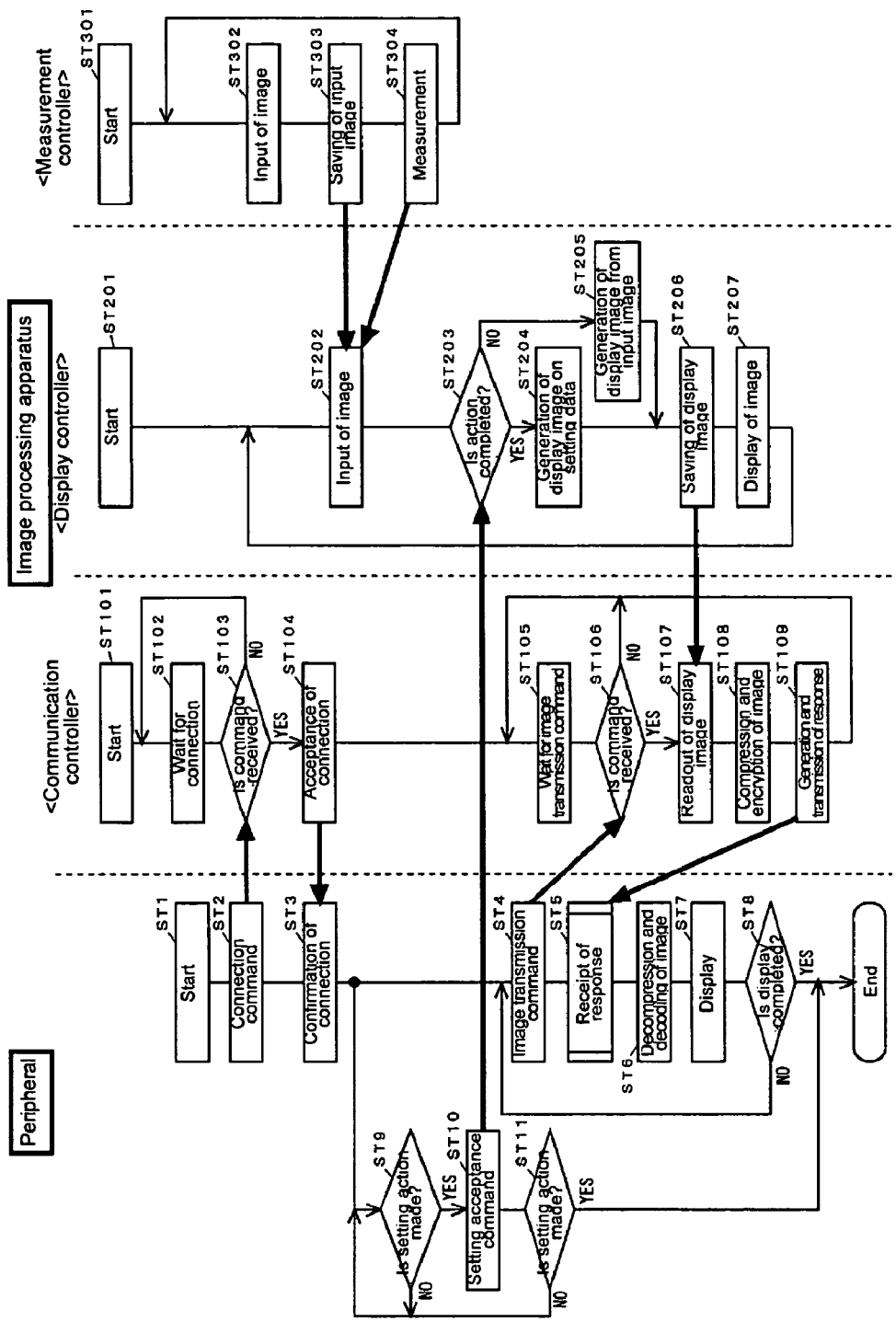
FIG. 20 shows a flowchart showing steps of the controlling action in the relationship between the image processing apparatus and the peripheral.

FIG. 20 illustrates a combination of actions between the peripheral 2 and the image processing apparatus 1. This combination includes a sequence of steps conducted between the single peripheral 2 and the image processing apparatus 1, provided that the communication controlling action shown in FIG. 7 is executed.

FIG. 20 illustrates the action of the image processing apparatus 1 divided into three functions of controlling the communication with the peripheral 2 (at a communication controller), controlling the display on the monitor (at a display controller), and controlling the measurement action (at a measurement controller). The three controllers are operated in parallel. The steps (ST) of the action of the communication controller are denoted after 100, of the display controller are denoted after 200, and of the measurement controller are denoted after 300. The action of the peripheral 2 includes Steps (ST) 1 to 11. The relationship between two particular steps is expressed by the solid arrow in the figure. For ease of the description about the setting acceptance command, the action of the image processing apparatus 1 will be explained with a procedure of updating the display image.

Starting at ST 301, the measurement controller in the image processing apparatus 1 repeats three consecutive steps of acquiring the image from the camera 11 (ST302), saving the image in the image memory 112 (ST303), and carrying out the measurement action over the image (ST304).

Starting at ST201, the display controller receives the image acquired or a modification of the image generated by the measurement action (ST202). It is then examined at ST203 whether the setting action is made or not. When the console 12 is operated or the setting acceptance command is dispatched from the peripheral 2, it is judged that the setting action is made. When it is judged "yes" at ST203, the procedure advances to ST204 where an image to be displayed is generated from the image acquired at ST202 and accompanied with the menu of setting or other information. When its is judged at ST203 that the setting action is not made, the procedure goes to ST205 where the image acquired at ST202 is designated as the display image.

This is followed by ST206 for saving in the image memory 112 the display image determined at ST204 or ST205. Also, the display image is displayed on the monitor screen at ST207.

The communication controller in the image processing apparatus 1 starts at ST101 and waits for receiving a connection command from the peripheral 2 (ST101~102). The connection command is a set of data including a registered password. When the connection command is received from the peripheral 2, it is judged "yes" at ST103. Then, the acceptance of the connection is transmitted the peripheral 2 at ST104.

This is followed by ST105 for waiting for receiving the image transmission command from the peripheral 2. When the image transmission command is received, the procedure moves from ST106 to ST107 where the display image saved at ST206 is read out. Meanwhile, as the communication controller, the display controller, and the measurement controller are operated in parallel, the display image obtained at ST107 is the latest image generated by the display controller. Also, the latest display image is generated from the latest image acquired by the measurement controller.

ST108 follows where the display image read out is subjected to the compression and encryption process. Then, the response is generated carrying the compressed and encrypted display image in the body and transmitted to the peripheral 2 at ST109.

The action of the peripheral 2 will be described. The action of the peripheral 2 starts with turning the power on, dispatching the connection command, and confirming the connected accepted by the response from the communication controller (ST1 to ST3). Then, the loop ST4 to ST8 and the loop ST9 to ST11 are executed in parallel.

The loop ST4 to ST8 is designed for controlling the display of the image. At ST4, the image transmission command is dispatched to the image processing apparatus 1. In turn, the communication controller in the image processing apparatus 1 performs the action of ST106 to ST109 for transmitting the response. Then, as the response is received as a sequence of packets, the receipt completion message is dispatched at ST5. After receipt of the response, the action moves to ST6 for decompressing and decoding the response to reconstruct the display image. This is followed by ST8 where the reconstructed display image is displayed on the monitor screen.

The above steps are repeated until the completion of the display is desired. Accordingly, the latest display image can be received from the image processing apparatus 1 and displayed by operating the former loop.

Although the decompression and decoding of the image data is conducted after the action of receipt at ST5 in the above loop, it may be executed upon receipt of each packet.

In the latter loop ST9 to ST11, the action of examination at ST9 is repeated until the setting action with the simulated commander 27 starts. When the setting action starts, the loop action moves from ST9 to ST10 where the setting acceptance command is dispatched to the image processing apparatus 1. The setting acceptance command is actually received by the display controller in the image processing apparatus 1. The display controller then carries out the action of ST203 and ST204. At ST206, the display image including the data of the setting action is saved. The display image including the data of the setting action is read out and dispatched to the peripheral 2 by the communication controller conducting the action of ST107 in response to the image transmission command which follows the setting acceptance command.

For executing the communication controlling action shown in FIGS. 8 to 10, the image processing apparatus 1 and the peripherals 2 carry out substantially the steps shown in FIG. 20 for exchanging the data. Therefore, discrepancies only will be described in brief.

For the communication controlling action shown in FIG. 8, the communication controller in the image processing apparatus 1 waits at ST109 for a given length of time before transmitting the response. When the image transmission command is received from another peripheral 2 during the waiting period, the response to the image transmission command is transmitted to each of the peripherals 2 after the waiting period. The action of the peripherals 2 remains unchanged.

For the controlling action shown in FIG. 9, the peripheral 2 performs the dispatching of the first image transmission command and measures the duration for processing before displaying the image received in response to the command. The, the second image transmission command is dispatched together with the measurement of the processing duration. Then, the peripheral 2 waits for receiving the direct response from the image processing apparatus 1 and carried out the action of displaying the display image upon receiving the response. At the time, the communication controller in the image processing apparatus 1 executes the action of ST107 to ST109 in response to the image transmission command excluding the measurement of the processing duration. When the image transmission command including the measurement of the processing duration, the action of ST107 to ST109 is carried out whenever the processing duration is elapsed.

For the controlling action shown in FIG. 10, the peripheral 2 confirms the connection at ST3 and then conducts the action of ST4. Then, the action of ST4 is repeated until the response from the image processing apparatus 1 is received. When the action of receiving the response at ST5 is completed, the action of ST6 and ST7 is preceded by dispatching the image transmission command. In this case, the action of the image processing apparatus 1 remains unchanged.

Figure 21:
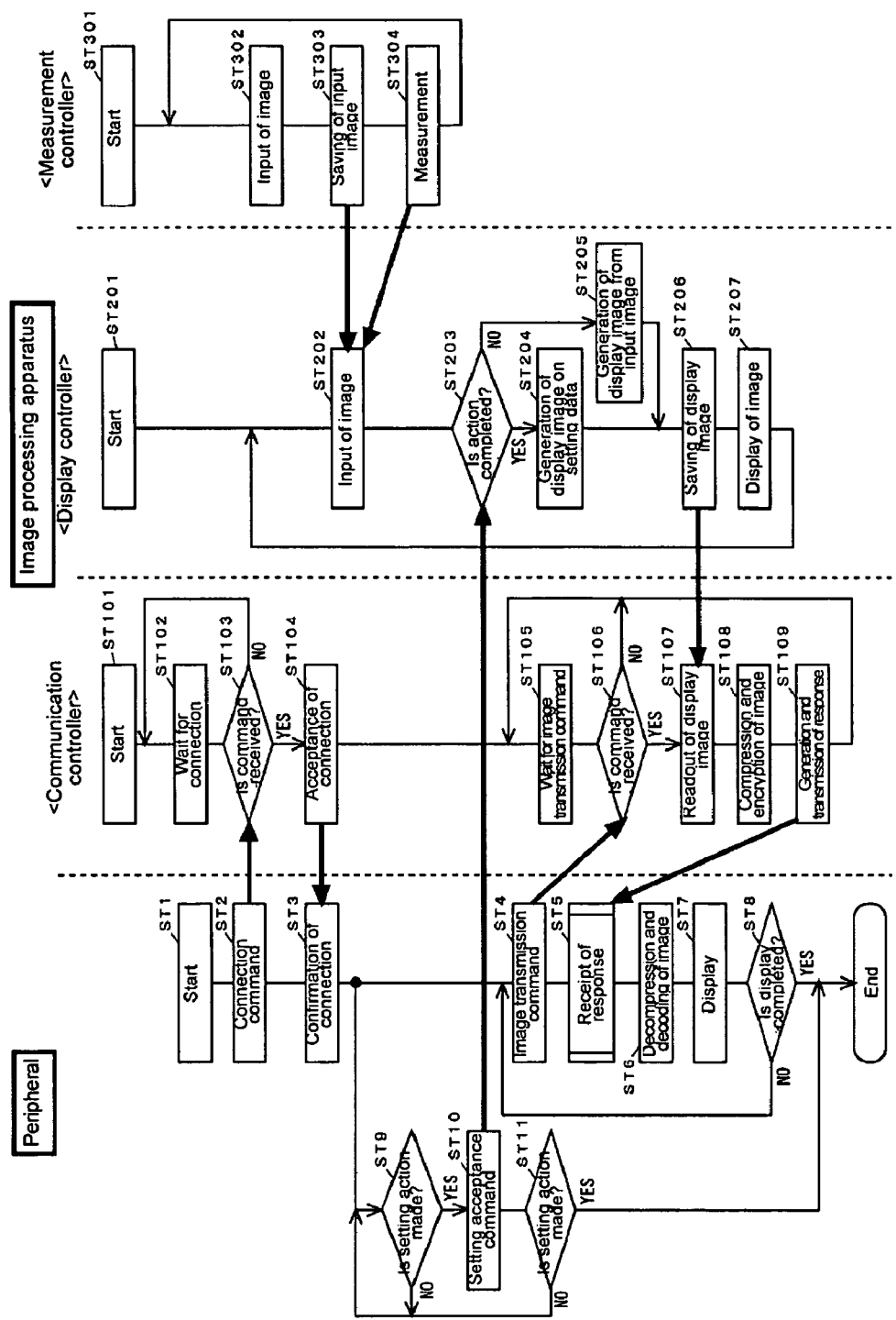
FIG. 21 shows a flowchart showing steps of the controlling action in the relationship between the image processing apparatus and the peripheral.

For the communication controlling action shown in FIG. 11, the steps are modified as shown in FIG. 21. The modification of the steps is made between the communication controller and the peripheral 2 while the other steps are identical to those shown in FIG. 20. Hence, like steps in FIG. 21 are denoted by like numerals as those shown in FIG. 20 and will be explained for discrepancies.

The communication controller in the image processing apparatus 1 when receiving the image transmission command at ST106 repeats the action of ST107 to ST109. The action of ST107 and ST108 is equivalent to that of Step A shown in FIG. 12. The action of ST109 is equivalent to that of Steps B to E shown in FIG. 12.

After dispatching the image transmission command at ST4, the peripheral 2 receives the response to the command and performs the action of ST5 to ST8. When the display action is completed, the action returns from ST8 to ST5 for repeating the receipt action, the decompressing and decoding process, and the display action upon receiving the response to the second command from the communication controller. Similarly, the action of ST5 to ST8 is repeated until "yes" stands at ST8.

The steps shown in FIG. 21 are applicable to the communication controlling action shown in FIG. 13. In the action, the communication controller in the image processing apparatus 1 when receiving the image transmission command from a particular peripheral 2 starts the action of ST107 to ST109 for the peripheral 2 which dispatches the command. Otherwise, the action of ST107 to ST109 is conducted at once for all the peripherals 2 being connected. The action of the peripherals 2 remains unchanged.

What is claimed is:

1. A method of controlling an image processing system which comprises an image processing apparatus and a desired number of peripheral apparatuses connected together over a computer network for carrying out a given measurement action, wherein the image processing apparatus repeats a first step of generating an image to be processed, a second step of generating a display image from the image to be processed, and a third step of saving the display image in a memory, and selectively performs, provided that an image transmission command based on a stateless protocol is received from any peripheral apparatus of the peripheral apparatuses, a fourth step of extracting a desired number of the display images from the latest saved in the memory and a fifth step of generating and transmitting to the peripheral apparatus a response of a specific format to the image transmission command, predetermined by the image processing apparatus, which contains the extracted display images but not a packet transmission data of the peripheral apparatus, and the peripheral apparatus performs a step A of dispatching to the image processing apparatus the image transmission command of the specific format predetermined by the peripheral apparatus, a step B of receiving the response to the image transmission command from the image processing apparatus, and a step C of displaying the display image, carried in the response, at the specific format predetermined by the peripheral apparatus on its monitor, wherein the peripheral apparatus performs one cycle of the steps A, B, and C, determines from the execution of the cycle a processing period of time needed for communicating with the image processing apparatus, and performs a step D of dispatching a secondary image transmission command including the processing period, the image processing apparatus performs the fourth and fifth steps one time in response to the image transmission command including none of the processing period and when receiving the secondary image transmission command including the processing period, performs the fourth and fifth steps whenever the processing period is elapsed, and the peripheral apparatus repeats the steps B and C after completing the step D.

2. A method of controlling an image processing system, according to claim 1, wherein the peripheral apparatus measures a period of time in which one cycle of the steps B and C is executed during performing the steps B and C after the step D and when the measured period is shorter by a given length than the processing period, repeats the step D through updating the processing period with the measured period, and the image processing apparatus when receiving the secondary image transmission command including an updated version of the processing period, modifies the interval between the fourth step and the fifth step according to the updated version of the processing period.

3. A method of controlling an image processing system, according to claim 1, wherein the peripheral apparatus, when the setting action for the image processing apparatus is conducted at its operation panel, performs a step E of generating and dispatching a setting acceptance command including the setting data to the image processing apparatus, and the image processing apparatus when receiving the setting acceptance command, performs a sixth step of updating the display image with the setting data carried in the command and a seventh step of saving the updated display image in the memory.

4. A method of controlling an image processing system, according to claim 3, wherein the setting action includes selecting items for the setting, and the image processing apparatus generates at the sixth step the display image including a menu of the items for the setting when receiving the setting acceptance command including the setting data.

5. An image processing system comprising an image processing apparatus and a desired number of peripheral apparatuses connected together over a computer network for carrying out a given measurement action, wherein the image processing apparatus includes an image inputting device for inputting an image to be processed, a display image generating device for generating a display image from the image input by the image inputting device, a memory for saving the display image, a command receiving device for receiving an image transmission command based on a stateless protocol from any peripheral apparatus of the peripheral apparatuses, an image extracting device for extracting a desired number of the display images from the latest saved in the memory, a responding device for generating and transmitting to the peripheral apparatus a response of a specific format to the image transmission command, predetermined by the image processing apparatus, which contains the extracted display images but not a packet transmission data of the peripheral apparatus, and a controlling device for actuating the image extracting device and the responding device, provided that the command receiving device receives the image transmission command, and the peripheral apparatus includes a command dispatching device for dispatching to the image processing apparatus the image transmission command of the specific format predetermined by the peripheral apparatus, a response receiving device for receiving the response to the image transmission command from the image processing apparatus, and a display controlling device for displaying the display image, carried in the response, at the specific format predetermined by the peripheral apparatus, wherein the peripheral apparatus includes a transmission command controlling device for performing one cycle of the actions of the command dispatching device, the response receiving device, and the display controlling device, determining from the execution of the cycle a processing period of time needed for communicating with the image processing apparatus, and directing the command dispatching device to dispatch a secondary image transmission command including the processing period, and the controlling device in the image processing apparatus directs the image extracting device and the responding device to perform their action one time in response to the image transmission command including none of the processing period and when receiving the secondary image transmission command including the processing period, directs the image extracting device and the responding device to perform their action whenever the processing period is elapsed.

6. An image processing system according to claim 5, wherein the transmission command controlling device in the peripheral apparatus includes a measuring device for measuring a period of time in which one cycle of the actions of the response receiving device and the display controlling device is executed when the secondary image transmission command including the processing period has been received, and a processing period updating device for updating the processing period with the measured period when the measured period is shorter by a given length than the processing period and then directs the command dispatching device to dispatch a further image transmission command including the updated processing period, the controlling device in the image processing apparatus when receiving the further image transmission command including the updated processing period, modifies the interval between the action of the image extracting device and the action of the responding device according to the updated processing period.

7. An image processing system according to claim 5, wherein the peripheral apparatus includes an inputting device for inputting the setting data for the image processing device and an setting acceptance command dispatching device for, when the setting data for the image processing apparatus is input by the setting action of the inputting device, generating and dispatching an setting acceptance command including the setting data to the image processing apparatus, and the display image generating device in the image processing apparatus, when the setting acceptance command is received by the receiving device, updates the display image with the setting data carried in the command and saves the updated display image in the memory.

8. An image processing system according to claim 7, wherein the setting action includes selecting items for the setting, and the display image generating device in the image processing apparatus generates the display image including a menu of the items for the setting when receiving the setting acceptance command including the setting data.

* * * * *